(12) United States Patent
Deangelis et al.

(10) Patent No.: US 7,023,476 B2
(45) Date of Patent: Apr. 4, 2006

(54) LINE OBJECT SCENE GENERATION APPARATUS

(75) Inventors: Douglas J. Deangelis, Woburn, MA (US); Mike Ciholas, Newburgh, IN (US); Kirk Sigel, Ithaca, NY (US)

(73) Assignee: Lynx System Developers, Inc., Haverhill, MA (US)

( * ) Notice: Subject to any disclaimer, the term of this patent is extended or adjusted under 35 U.S.C. 154(b) by 736 days.

(21) Appl. No.: 10/166,907

(22) Filed: Jun. 10, 2002

(65) Prior Publication Data

US 2002/0149679 A1    Oct. 17, 2002

Related U.S. Application Data

(60) Division of application No. 08/981,757, filed as application No. PCT/US95/08359 on Jun. 28, 1995, now Pat. No. 6,542,183, which is a continuation of application No. 08/265,063, filed on Jun. 28, 1994, now Pat. No. 5,552,824.

(51) Int. Cl.
*H04N 5/228* (2006.01)

(52) U.S. Cl. .................................. 348/222.1; 348/254

(58) Field of Classification Search ............. 348/222.1, 348/254
See application file for complete search history.

(56) References Cited

U.S. PATENT DOCUMENTS

| 4,809,067 | A |   | 2/1989 | Kikuchi et al. |
| 5,136,376 | A |   | 8/1992 | Yagasaki et al. |
| 5,546,477 | A | * | 8/1996 | Knowles et al. ............. 382/242 |
| 5,548,689 | A | * | 8/1996 | Poppenga et al. ........... 358/1.9 |
| 5,550,646 | A | * | 8/1996 | Hassan et al. .............. 358/442 |
| 5,552,824 | A | * | 9/1996 | DeAngelis et al. .......... 348/157 |
| 6,282,687 | B1 | * | 8/2001 | Maeda et al. ................ 714/763 |

FOREIGN PATENT DOCUMENTS

| CA | 2027526 A1 | 4/1991 |
| CA | 1292060 C | 11/1991 |

\* cited by examiner

*Primary Examiner*—Tuan Ho
(74) *Attorney, Agent, or Firm*—Lathrop & Gage LC

(57) ABSTRACT

The invention provides a system for recording and displaying a time sequential scene on a computer (16). The digital camera (12) transmits a sequence of digital image frames to the timer (14) representative of the image of a body passing a plane in space. Each frame represents a line object (18) of the body, thus forming a fractional part of the scene. Once the frame reaches the image timer (14), it is digitally marked with a time reference (34) and buffered into a block of information. The main control computer (16) stores blocks of information from the image timer (14) for a variety of processing and features available to the user. The invention also provides a selected memory (36), preferably a virtual memory subsystem, or hard-disc drive. Preferred constructions for adjusting camera pixel processing of light values, time-marking the images, creating color palettes for interactive viewing of color images, and video data coding to accommodate the high volume of line image data are described.

4 Claims, 12 Drawing Sheets

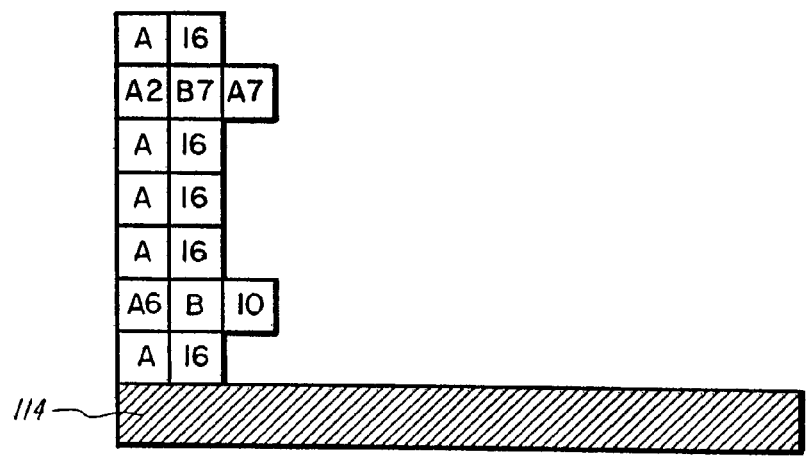
FIG. 7A
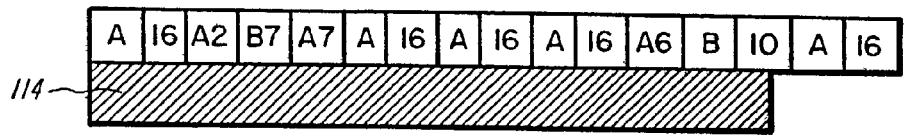
FIG. 7B
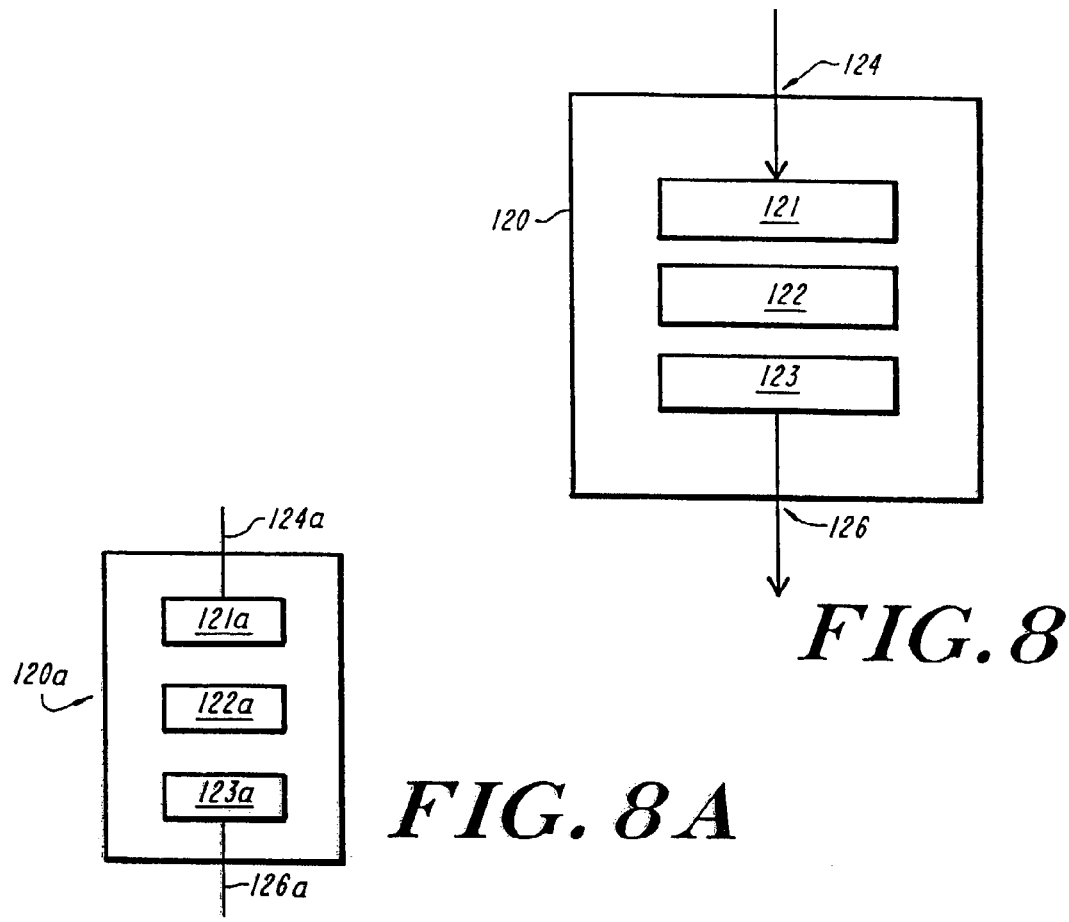
FIG. 8
FIG. 8A

$$D_{PREDICT} = C + (B - A)$$

$$E_{PREDICTOR} = (D - D_{PREDICT})$$

LINE OBJECT SCENE GENERATION APPARATUS

"This application is a divisional application of application Ser. No. 08/981,757 filed on Dec. 23, 1997, now U.S. Pat. No. 6,542,183 which in turn is a national phase application of serial no. PCT/US95/08359 filed on Jun. 28, 1995, published, which claims continuation priority from application Ser. No. 08/265,063, filed Jun. 28, 1994, issued as U.S. Pat. No. 5,552,824. The contents of all of the aforementioned application(s) are hereby incorporated by reference."

FIELD OF THE INVENTION

This invention is directed generally to systems which monitor and record motion events. More particularly, it relates to the accurate management and control of time-sequential imaging and display, with application in numerous fields of science and technology. Most particularly, the invention provides a total race-management system which has wide ranging utility in measuring timed sporting events.

The invention also relates to systems and methods for generating a scene by compilating successively-scanned line objects. As such, the invention also concerns apparatus for compressing those scenes into manageable data files and for color coding scene information efficiently.

BACKGROUND OF THE INVENTION

Prior art systems which track and record a motion event over time are overwhelmingly directed towards the support of racing events. Standard photographic techniques which monitor the finish line of a race are known. Typically, cameras equipped for high resolution imaging view the finish line and sequentially capture pictures at a high rate for later use by an interpreter. However, this process is cumbersome, wasteful, and time-consuming, requiring, for example, an apparatus of photographic film and paper, processing chemicals, and image enlargers or projection optics. Consequently, most races rely on human judges and revert to "photo-finish" technology only in extremely close races. Specialty Instrument Corporation provides a myriad of such electronic and photo-finish systems under the trademark Accutrack™. U.S. Pat. No. 3,829,869 exemplifies one such Accutrack™ system.

Because of the problems with the "photo-finish" technology, numerous other systems for monitoring racing events have been developed. However, these other methods and systems for timing sporting events present new difficulties. Video systems which record and display races in a standard television or video format are popular, but regardless of the particular implementation of these systems, a portion of the electronic image remains on an analog medium, e.g., video tape. Since analog data from the systems consists of a continuum of information over time, it is relatively difficult to accurately apportion to a unique time interval. It is even more difficult to access a particular moment in time in the recorded sequence because the associated system must search the storage medium, typically having a long physical length in a spooled format, e.g., a video cassette. This presents both limitations and difficulties for users wishing to simultaneously record, view the current race, and review earlier segments of the race (or even a previous race) because only one user can have access to any of the information stored and recorded at any one time.

A further difficulty in analog data is that it must be converted to a signal usable for video, television, or a computer before it is displayed. For example, after a completed search, the selected video tape segment is typically sent to active memory before it can be processed by a computer and, quite possibly, by supplemental complex graphics generators. Altogether, the analog format and related processing adds to the time required to review a race and therefore lengthens the decision making process.

Another problem faced by race systems occurs in the management of extended time events, like a marathon or bicycle race, which can last for hours or until each entrant finishes. The runners or cyclists cross the finish line in groups; and for long periods, the finish line is void of persons. The relevant information at the finish line is thus sporadic, and includes significant amounts of "dead" time. In analog systems, this dead time is nevertheless recorded and stored so that the system can retain time synchronism with the event, even though it is generally useless for other reasons and adds to the time required for processing and reviewing the race.

Several race systems have attempted to improve the management and accessibility of data taken during a race by transforming the recorded information to a digital equivalent. But, these systems also revert to an analog format before displaying the race on a screen. As examples, U.S. Pat. No. 4,797,751 shows a video recording system having both digital and analog sections to provide display on a common cathode ray tube (CRT). U.S. Pat. No. 5,136,283 similarly describes another partially digital system which displays races on a standard television format. These analog/digital systems still have many of the problems inherent in all analog systems.

It is, accordingly, an object of the invention to provide a system for recording and displaying a time-sequential scene of bodies crossing a plane. In particular, the system provides improvements in managing and recording timed sporting events which reference bodies or entrants crossing a finish line relative to the start of an external event.

Still another object of the invention is to provide improvements in the manipulation of timed information representative of bodies passing a plane in space, such as person crossing a finish line in a race.

Yet another object is to provide improved access, control and storage of a scene comprising a sequence of discrete time images.

Most particularly, it is an object of the invention to provide a race monitoring and recording system which can record and display a race in a digital format.

Still another object of the invention is to store and display color scenes on a computer system with efficient color coding.

These and other objects will become apparent in the description below.

SUMMARY OF THE INVENTION

The invention features, in one aspect, a system for recording and displaying a time sequential scene of bodies moving across a plane in space. The system includes at least one digital camera which views and images a line object in the plane of interest. The camera time-sequentially captures the line object by imaging it onto an array of detector elements and converts the sampled signal into a digital image, or frame, of the line object. Each digital image frame uniquely represents a slice of the moving scene at a moment in time. The system also includes an image timer, with a timer processor, that responds to a preselected digital value from the camera and marks each frame with a digital time reference using a preselected number of bytes within the frame information. The image timer may also store the digital frames from the camera in an internal buffer. The system further includes a main control computer having an internal memory, a user console, and a graphics display monitor. The computer stores the frames from the image timer buffer as blocks of information in its internal memory, via an associated software pointer, and selectively displays a portion of the stored frames as a time-sequential scene on the monitor. A user at the computer console can command a variety of functions provided by the invention to manipulate and analyze the captured scene, most particularly to display any portion of the scene of bodies moving across the plane and access an associated time for any frame within.

The system thus summarized is particularly useful in recording and managing the official times of objects or entrants crossing a finish line, and at a rate which is over fifty times faster (and more accurate) than a related video race management system. A user can record and display the bodies crossing the plane of interest, i.e., the finish line, with accuracy while maintaining the ability to review and edit in real-time the stored images. Accordingly, it is useful that the time references associated with each frame are triggered with a start sensor and correlated to the start of an external event, e.g., a gun start signal. The invention thus provides, in another aspect, a timer clock that is synchronized to the start of an event and which provides the timer processor with an accurate reference to mark the respective moments in time for each frame.

In other aspects, the digital camera can include a line scan charge coupled device which forms the array of detector elements. The camera can also include a greyscale gain controller to adjust the digital output signal according to a preselected gain level, preferably selectable at the main control computer, and, preferably, to a gain level corresponding to the digital values in the captured frames. The gain controller can function in a real-time fashion by adjusting the greyscale gain applied to each frame as captured by the camera during operation of the invention. The camera is completely computer controlled from a remote location. This computer control, which is achieved by passing signals along the coaxial cable, allows remote control of focus, zoom, pan and all other camera functions.

In still other aspects, the resolution of the scene as captured by the camera, or as displayed on the screen, is selectable by a user. With respect to the camera, the resolution in the time-domain, i.e., in the direction of motion, is adjustable by selecting the frame rate at which the camera captures the digital image frames. The resolution in the spatial-domain, i.e., along the line object length, is adjustable by changing the camera density control which activates only particular detector elements in the array.

With respect to the resolution as displayed on the monitor, the user can, in another aspect, zoom a particular scene in or out on the screen. For example, by zooming the scene out, the whole race can be viewed at once; and by zooming in, particular areas of the scene are enlarged on the screen, suitable, for example, to interpret the number identifier of a particular runner. The zoom capability is available to users at the main control computer in either screen dimension, i.e., in the time and spatial directions, concurrently or independently.

A user of the system thus described has a variety of controls at the main control computer. Any frame of a displayed scene can be removed, either temporarily or permanently, according to other aspects of the invention by "cropping" the frames. A list of "cropped" frames is placed into a listing memory. A time-crop control allows a user to cutout, or "crop", uninteresting portions of the scene—for example periods of time containing no activity or bodies crossing the plane—while retaining an absolute time reference for the remaining frames, which collectively display a continuous scene. The time-crop control further can restore the cropped frames, by deleting them from the listing memory, or permanently erasing them.

In another aspect, a user can also selectively reverse the time-sequential order of the displayed scene so that the scene as displayed appears as though the motion of bodies passing the plane in space occurred in the other direction. In addition, a user can point to particular bodies on the display to provide both an object identifier, if selected, and a unique time identification representative of the point selected.

The system constructed in accordance with the invention also provides, in another aspect, a virtual memory subsystem, like a hard-disc drive. The main control computer stores blocks of information into the virtual memory subsystem to free space in its own internal memory and to provide a storage medium for previous scenes, for example previous races. Storage into the virtual memory subsystem is initiated by an optional command or can occur automatically when a predetermined selectable fraction of the internal memory is utilized. The storage arrangement on the virtual memory subsystem is, in another aspect, ordered so that the main control computer can access and selectively retrieve a block of information from the virtual memory subsystem for storage in its internal memory by computing an offset from the initial memory location where the blocks of data are stored. In this manner, the internal memory of the main control computer can function as a cache for the virtual memory subsystem, thereby storing only a few active blocks in volatile RAM.

To aid the storage capability of the virtual memory subsystem, the invention accordingly provides a compression system to compress the blocks of information into less memory space. The compression system is selectively controlled, both in initiating the compression of certain data and in regulating the accuracy of the compressed information.

The compression system takes advantage of the fact that each digital image frame comprises a column of n-bit numbers, and a sequence of digital frames thus forms an array of rows of n-bit numbers. In a preferred aspect, the compression occurs by first converting the array of digital image frames to an array of rows of m-bit greyscale numbers (where the integer m is less than the integer n). The converted array of rows of m-bit digital image frames is then reformatted in a row-by-row fashion by collecting adjacent and equal m-bit numbers into a group and representing the collection as a "count" and a greyscale "value". These rows are reformatted again into a sequential memory string thereby compressing the data to a smaller amount. Preferably, the "count" is either a byte or a 3-bit number, and the m-bit "value" is formed by a 5-bit representation of each of the original n-bit numbers, although the accuracy of the compression is selectable by a user by changing the number m. If the count is a 3-bit number, the count and value form one byte. For example, a 4-bit number can be used to compress the data further.

In yet another aspect, the invention can include a plurality of digital cameras, each with an associated buffer within the image timer, to independently capture a sequence of digital image frames. Thus multiple scenes are generated, preferably of a view containing substantially the same line object, for display on the computer. At least two scenes can be shown simultaneously on a single monitor from two separate cameras in both a real-time display or from previously recorded segments. In another aspect, one or more additional computers are installed in communication with the virtual memory subsystem to access and separately display and manipulate data captured by any one of the connected cameras. Thus, a second user can analyze previously recorded motion segments while a first user concentrates on a current motion event.

The digital camera and image timer each have associated processing CPUs which can selectively compress data before transmission along a signal line. For example, the digital camera can reduce the bandwidth requirements of the signal line or cabling between it and the image timer by commanding a first compression on the digital data transmitted from the camera. The image timer can reduce the bandwidth requirements of the cabling or signal line between it and the main control computer by commanding a second compression on the data transmitted between the two using a similar compression scheme.

In a preferred aspect, a single cabling is used between the image timer and camera. This cable preferably is in the form of a single coaxial cable that functions as a signal line to command various functions at the camera, a data transfer line to transmit digital information to the image timer, and a power line to supply power to the camera. Similarly, the cabling between the image timer and main control computer or any additional computers can have like capability.

In still another aspect, the main control computer allows a user to access an object identifier and an associated time corresponding to the object, e.g., for use in a race-management system. For example, prior to the start of a race, the lanes within the camera field of view can be spatially referenced to a portion of the displayed image such that when a user points to that portion, both the lane number and any associated object, e.g., a race entrant, is available on the display monitor. Further, according to an additional aspect, the time and name of a particular object is automatically entered within a results window on the display monitor once a user so commands it.

These and other aspects will become apparent in the following description, where the invention is described and illustrated in connection with certain preferred embodiments; however, it should be clear that various additions, subtractions, and modifications can be made by those skilled in the art without departing from the scope of the invention.

BRIEF DESCRIPTION OF THE DRAWINGS

A more complete understanding of the invention may be obtained by reference to the drawings in which:

FIG. 7A shows a second illustrative step in the compression of the data sequence shown in FIG. 7.

FIG. 7B shows a third illustrative step in the compression of the data sequence shown in FIG. 7A.

FIG. 8 schematically shows a first compression system constructed in accordance with the invention.

FIG. 8A schematically shows a second compression system constructed in accordance with the invention.

DETAILED DESCRIPTION OF THE INVENTION

Figure 1:
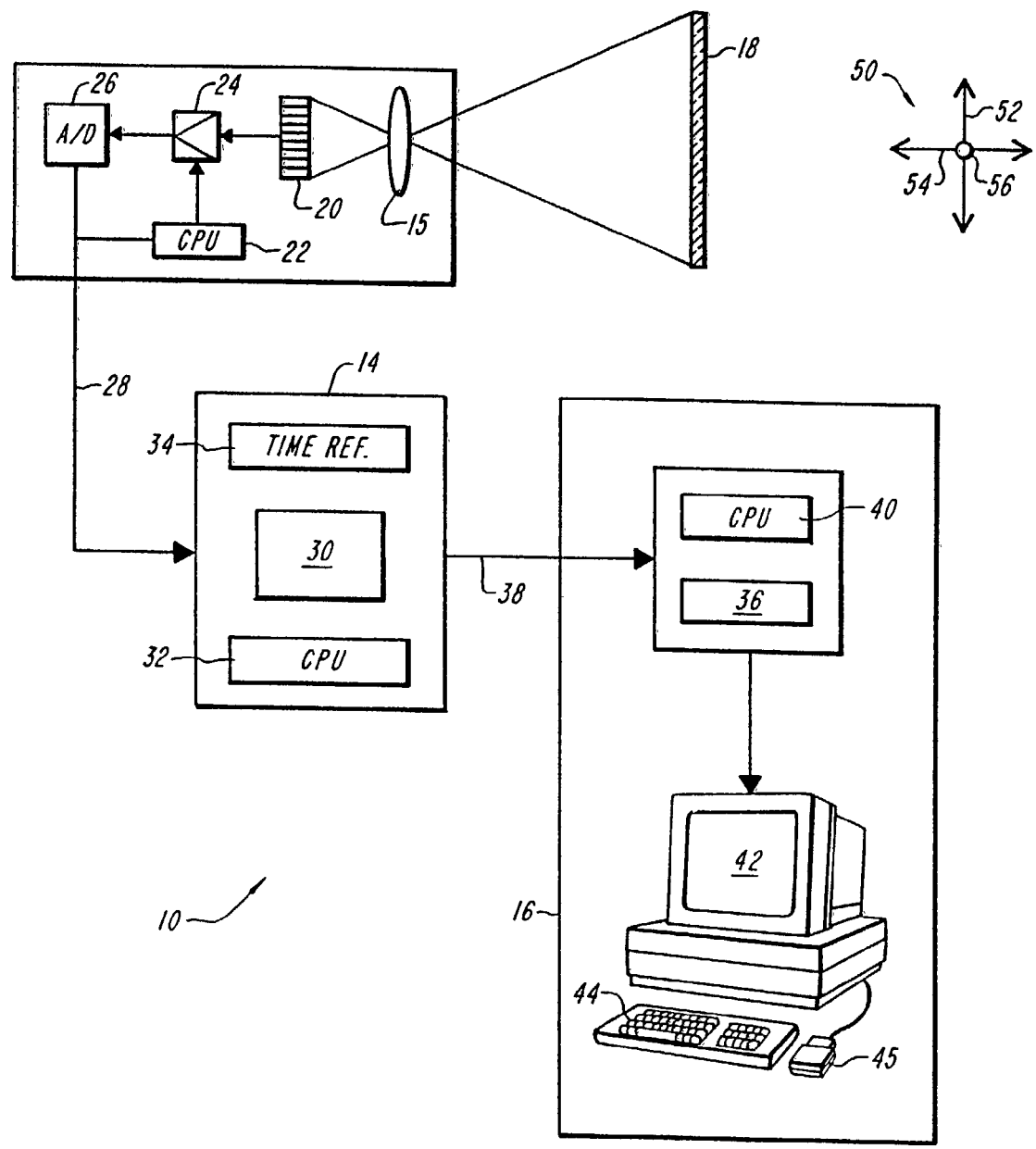
FIG. 1 schematically illustrates a system constructed in accordance with the invention for recording and displaying a time-sequential scene of bodies crossing a plane.

FIG. 1 illustrates a system 10 constructed in accordance with the invention for recording and displaying a sequence of bodies crossing a plane in space. The system includes a digital camera 12, an image timer 14, and a main control computer 16. With internal optics 15, the camera 12 views and images the line object 18 onto an array of detector elements 20, preferably a Line Scan Charge Coupled Device (LS-CCD). A camera processor 22 time-sequentially samples the image at the detector elements 20 and amplifies and digitizes the output signal at the gain controller 24 and A/D converter 26, respectively. Each sampled image represents a frame of digital information at a unique moment in time.

Each digital image frame is transmitted along a signal line 28, preferably a coaxial cable, to the buffer memory 30 of the image timer 14. The timer processor 32 marks each frame as it enters the image timer 14 with a time reference, preferably generated by the timer clock 34, by storing the time reference within the digital information of the frame. Thus each digital image frame stored in the buffer contains both the stored digital representation of the line object 18 and a unique time associated with it. In a preferred embodiment, the time reference for each frame is indicative of the time the camera 12 captured the picture relative to the start of an external event.

The buffer 30 stores the frames generated from the camera 12 until they accumulate to a preselected memory allocation, called a "block", after which the main control computer 16 transfers the block to its own internal memory 36 via a signal line 38.

The main control computer 16 has a central processor 40 that processes the blocks of information stored within the internal memory 36 so that the scene and time contents of a sequence of digital image frames are displayed on the display monitor 42. The central processor 40 also controls the automatic operation and memory management of the system 10, and responds to inputs at the keyboard 44 and mouse 45 so that a user can selectively command the display of any scene captured by the system 10, including a real-time display or previously recorded segments. More particularly, a user can access the unique times associated with any portion of the scene.

In a preferred embodiment, commands to the digital camera 12 from the timer 14 and the main control computer 16 are transmitted within the signal line 28, which is a single coaxial cable. The coaxial cable 28 additionally acts as a power control line to supply energy to the camera 12 so that the camera 12 can operate without a remote power source.

With further reference and description of FIG. 1, a three-dimensional orientation chart 50 is provided to facilitate a better understanding of the operation of the invention. The system 10 operates by sequentially capturing the image of the line object 18 as viewed by the camera 12 at discrete moments in time. The line object 18 is typically only a fraction of a "scene" as observed by a person at the display monitor 42. That is, each line object 18 captured by the camera 12 sequentially forms part of a larger picture, or "scene", of the bodies moving by the field of view (FOV) of the camera 12. This FOV is essentially a plane in space, representable by the axes 52 and 54 of the chart 50, because the detector array 20, and its conjugate line object 18, are practically one dimensional: the line object 18 has its long dimension along the axis 52 of the chart 50 and its short dimension (not shown) along the axis 56 perpendicular to the page of FIG. 1. The camera 12 focuses on the line object 18 at a distance directed along the axis 56 from the camera to the object 18.

Figure 2:
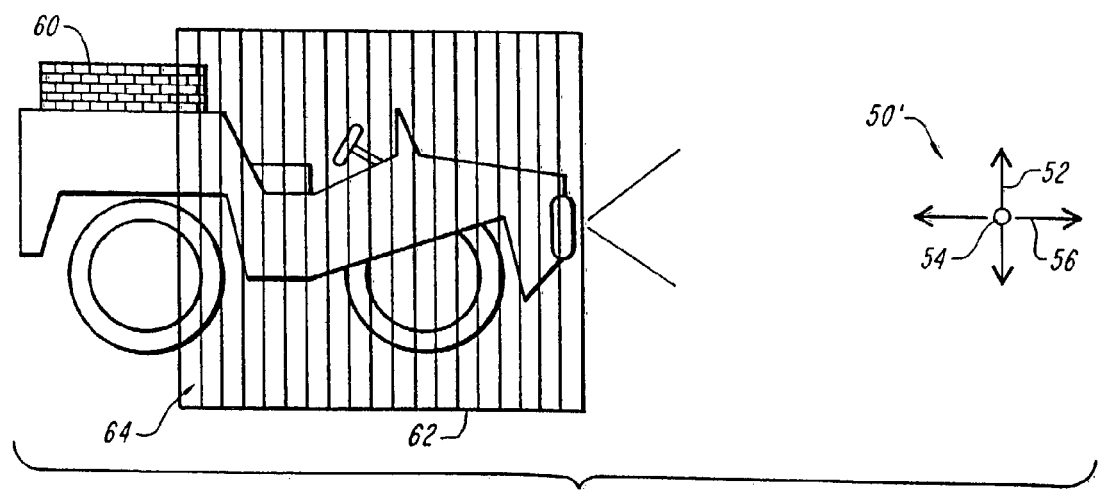
FIG. 2 illustrates how a system constructed according to the invention sequentially constructs a scene from discreetly sampled line objects.

Thus for example, FIG. 2 illustrates an object 60 which is in motion along the axis 56 of chart 50', a 90° rotation of chart 50. The camera (not shown) is focused on the object 60 with a FOV substantially in the plane of axes 52 and 54. As each frame is captured, a portion of the object 60, i.e., a line object, is uniquely and spatially represented as a digital image frame. In FIG. 2, the successive line objects captured by the system are illustratively shown on the object 60 as successive rectangles 62. For each of the line-objects 62, the digital camera 12 correspondingly generates a frame by sampling the image of the line object according to the number of detector elements within the array 20. That is, each of the line objects 62 is digitally segmented along its length (i.e., along the axis 52) into a digital image frame according to the sampling at the detector array 20 and transmitted at a moment in time to the image timer 14. In a real-time aspect, line object 64 represents the most recently captured frame and the remainder of the object 60 to the left of line object 64 has yet to be captured by the system. A scene or composite image of an object displayed on the computer 16 can look very much like the actual object passing by the FOV of the camera 12.

As mentioned earlier, each digital image frame captured by the system 10 of FIG. 1 is marked with a particular time reference from the camera and stored into blocks of information at the computer 16. The camera sends a special digital value to the timer which the timer recognizes as a start/end of a frame. The timer then marks the received frame with the associated time reference.

Figure 3:
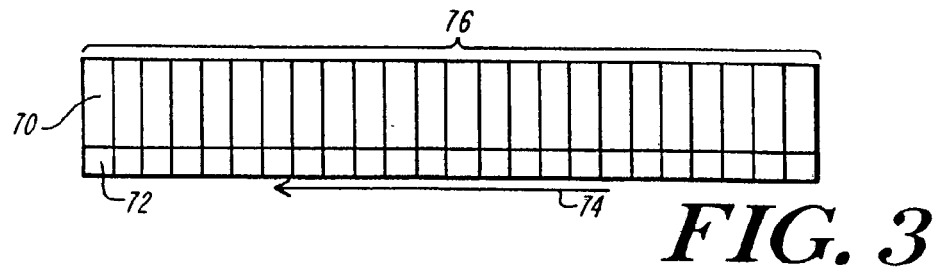
FIG. 3 illustrates a collection of digital image frames forming a block of information, where each frame is marked with an associated time reference.

FIG. 3 illustrates more fully these operations. Each digital image frame 70 captured by the system 10 includes an array of digital bytes corresponding to the signal detected by the activated elements of the array 20. When a frame enters the image timer 14, the timer processor stores the time associated with that frame in the last four bytes 72, thereby permanently associating each frame with a unique time. In FIG. 3, time is shown increasing with the arrow 74; thus frames towards the left of FIG. 3 are later in time than those on the right.

FIG. 3 also illustrates the collection of frames which form a block of information 76 utilized by the main control computer 16. According to a preferred embodiment, frames are organized into blocks of information that are 16k-bytes in size. The number of frames which make up the block 76 therefore depends upon the amount of information within each frame—which is a variable dependent upon the further features of the invention discussed below.

Figure 3A:
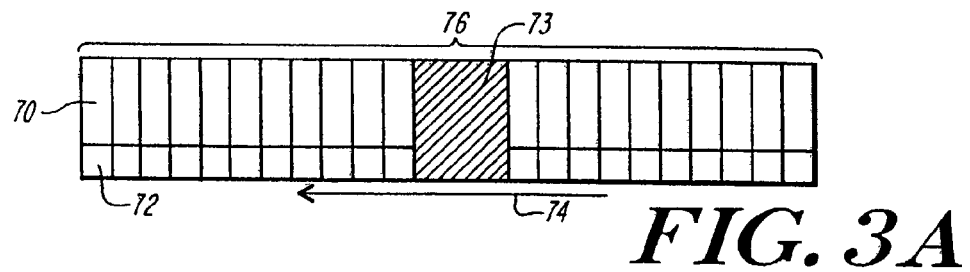
FIG. 3A illustrates a preferred embodiment of the invention in which particular frames are cropped from a sequence of frames.

FIG. 3A illustrates a particular feature of the invention which is enabled because of the unique time reference associated with each frame of FIG. 3. In particular, according to a preferred embodiment, a user at the display monitor 42 of FIG. 1 can select and crop selected frames 73 from the scene displayed without disrupting any of the information available in any other frames. A cropped portion 73 can be within a block 76, as illustrated in FIG. 3A, or some portion thereof (not shown). The address of the cropped frames are initially sent to a listing memory (a memory associated listing table) which holds their addresses until they are either erased permanently (which can occur by a "save" operation) or re-inserted within the cropped sequence. This is particularly useful in a scene or race which has uninteresting segments that simply waste valuable memory. It also helps in the interpretation of a displayed scene because both the overall length of the scene as viewed from the monitor is decreased and the depth aspect of the displayed scene is improved. If, for instance, a first runner was several seconds ahead of a second runner, the recorded sequence between the runners can be cropped and the display on the screen appears as though no significant time between the runners exists. Of course, the time relationship of the runners remains accurate and when a user accesses the times associated with the runners, the time-discontinuity between the two will become apparent.

Figure 4:
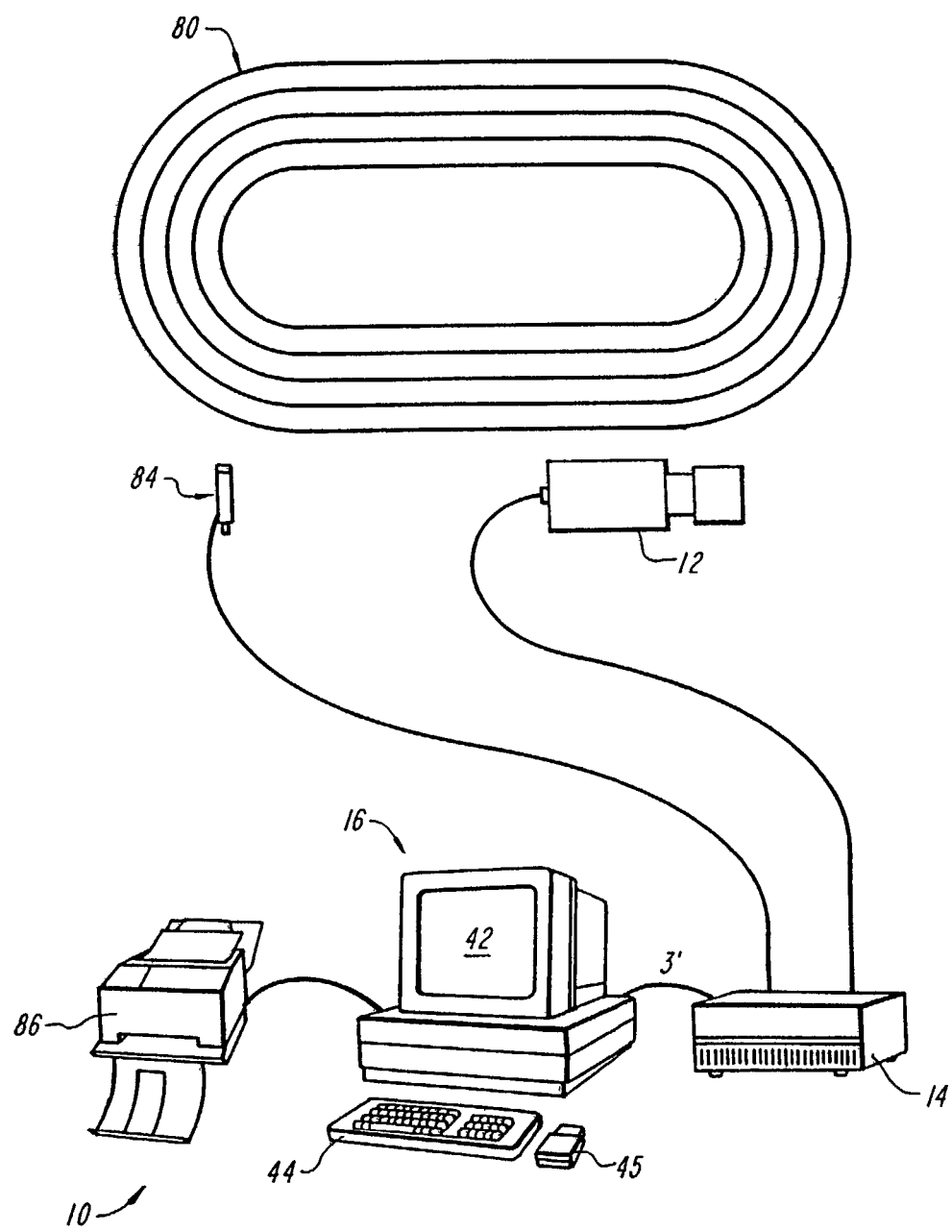
FIG. 4 illustrates a preferred use of the invention in which a system constructed in accordance with the invention operates as a race-management system which views and records a race.

As discussed earlier, the most obvious use for a system constructed in accordance with the invention is directed towards race management. FIG. 4 illustrates a system 10 in a configuration suitable to capture the motion of bodies crossing the finish line of a race. The system 10 is illustratively shown next to the race course 80 with the digital camera 12 located to view the plane representative of the finish line. The image timer 14 receives digital image frames from the camera 12 at a frame rate selectable within the system 10 and marks each frame with its associated time reference. The main control computer 16 retrieves and stores the frames from the image timer 14 as blocks of information and displays the recorded scene on the display monitor 42. The computer 16 also allows a user, in the illustrated embodiment, to control certain features of the invention described below by the keyboard 44 and a computer mouse 45.

Also shown in FIG. 4 is a start sensor 84 which responds to the start of an external event, for example the start gun which signals that the race has begun, and which signals this time to the image timer 14. The timer clock 34 of FIG. 1 is calibrated to this start signal and the timer processor 32 marks each of the frames entering the timer 14 with a time reference that is relative to the detected start time.

A printer 86 can be installed with the system 10 to print selected scenes and information about the event recorded.

Figure 5:
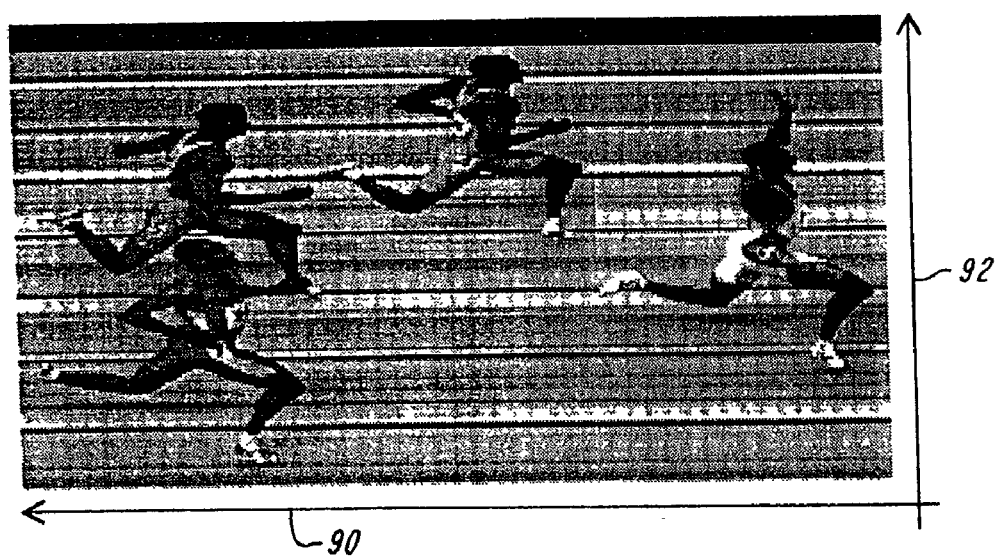
FIG. 5 illustrates a typical display of a racing scene generated by a system constructed in accordance with the invention.

FIG. 5 illustrates a scene generated by the system 10 of a race containing four participants, exemplifying a typical display available on the monitor 42 (FIGS. 1 and 4) and printer 86 (FIG. 4). In FIG. 5, the arrow 90 is in the time dimension and points to increasing time; while the arrow 92 refers to the spatial dimension corresponding to the spatial information within the digital image frames. This image can be zoomed in or out on the monitor 42 (described in more detail below) by a user operating the computer 16. In the preferred embodiment, a user of the system 10 can select the resolution or image quality of a scene generated by the system 10 by adjusting any of three separate parameters. First, by adjusting the frame rate, i.e., the rate at which the camera captures each line object in the scene, the amount of resolution information available along the axis 90 changes. Secondly, by adjusting the camera density, i.e., by selectively activating or deactivating certain elements along the detector array 20, the resolution information available along the axis 92 changes. Third, by zooming in and out on the display monitor, the amount of displayed resolution changes in either or both of the axes 90 and 92. In general, the best display detail or resolution occurs when the user displays every frame recorded by the system 10 at a high frame rate and every pixel is activated on the detector array 20.

However, other considerations must be made when adjusting these three parameters. First, it may seem intuitive that the highest frame rate available by the system is preferable in all instances. But if the frame rate is too fast, the objects can appear "fat" on the monitor 42, unless zoomed out. For example, if the race consists of runners traveling at about 20 mph, approximately 500 frames per second makes the participants appear normal on the display 42 without zooming. If the entrants were instead tortoises, a much slower frame rate would be preferable (if they are slower by $\frac{1}{100}$, for example, a frame rate of 5 Hz would be ideal). Another factor influenced by the frame rate is the energy available to the detectors within the camera. If the frame rate is too fast, the image could appear dim because the detectors did not have sufficient time to integrate the available light energy from the line object. This depends, of course, on the sensitivity of the detectors and the spectrum utilized by the camera. In the preferred embodiment, the detector array 20 of FIG. 1 responds to visible light energy, and therefore requires more time to capture a particular image at dusk or twilight hours. If, on the other hand, the array 20 was constructed to respond to infrared energy, for example with HgCdTe material, the frame rate would be adjusted according to the temperature and speed of the objects.

The invention thus provides an automatic gain control (AGC) mechanism to actively compensate for differing levels of light energy from the scene of interest. The camera processor 22 and gain controller 24 of FIG. 1 programmably adjust the gain applied to the digital image frames transmitted from the camera to the image timer in real-time. The camera processor 22 responds to a command from the main control computer to raise or lower the gain in conjunction with the gain controller 24 by quantifying the digital values within the digital image frames output from the A/D converter 26 and modifying the sensitivity of the camera.

For example, if the average digital value in a series of image frames is too low, the scene at the computer would appear dim. A command by the user at the main control computer to increase the gain appropriately improves the displayed screen contrast. A user can also select how fast the AGC control of the camera operates by adjusting the bandwidth of the gain control. A user effectively changes the AGC bandwidth by selecting the amount of time the camera 12 takes to quantify the average digital value used in setting the active gain. Although not generally practical for the majority of motion events, like races, the gain could theoretically vary for every frame generated by the camera by increasing the AGC bandwidth to a maximum setting.

In a preferred embodiment of this aspect of the invention, the camera 12 IS employs a novel signal conditioning circuit 24a, 24 (FIG. 1A) to improve the pixel data generated by the line sensor 20. As shown, the sensor output 20 is amplified by the gain controller 24 which generally selects one of a number of possible gain levels $L_i$ based on camera operator or system operator commands as discussed above, and/or programmed microprocessor control based on current lighting conditions, scene light levels and the like, or a combination of program control and operator selection. The gain-control 24 employs an initial preamplifier $24_i$ which compares the sensor output level of each pixel to an offset voltage. In the prior art this has been generally a constant threshold voltage set at the factory based on sensor characteristics. However, in accordance with this aspect of the present invention, rather than a preset threshold, preamplifier $24_i$ receives an offset voltage input from circuit (designated generally 24a) that is a variable function of the noise or dark current output of the CCD sensor array. The offset voltage is subtracted from the video output of the sensor by the preamplifier. The video signal is then amplified by one of several selectable gain circuits as before and the analog to digital converter 26 converts the amplified video signal into an 8 bit value.

Figure 1A:
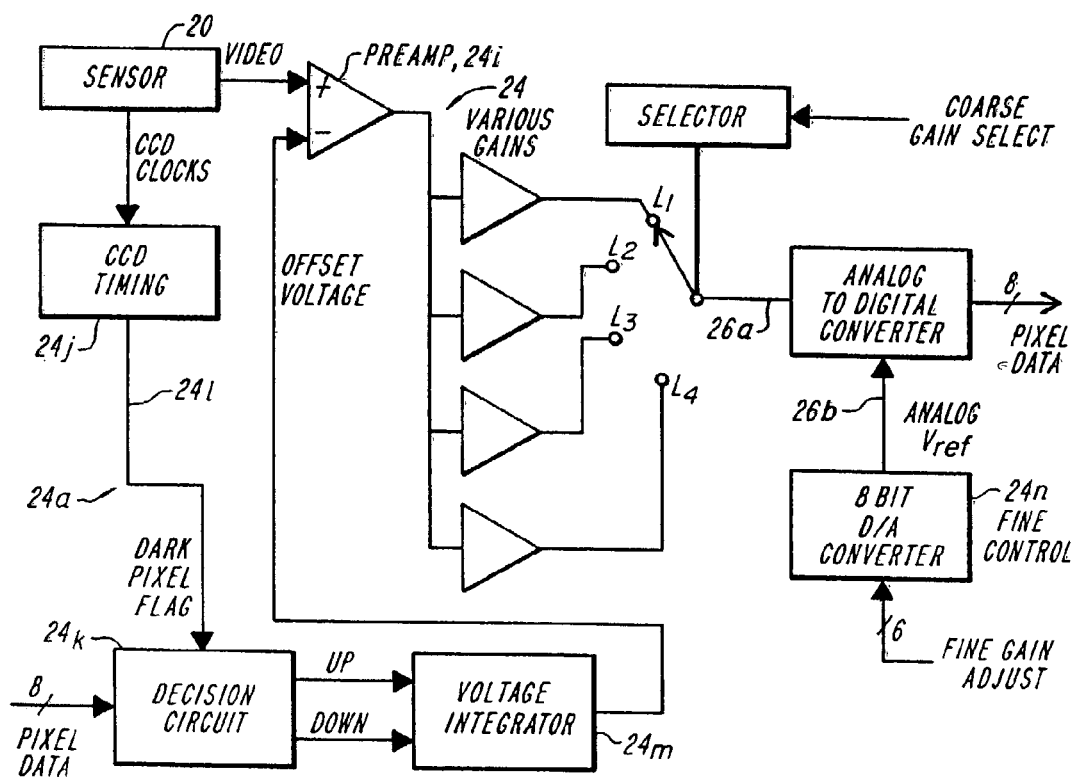
FIG. 1A illustrates adaptive signal processing in a preferred camera used in the system of FIG. 1.

As shown in FIG. 1A, the CCD sensor 20 has a line of sensing pixels and also has one or several "dark pixels". These are regions of the array that have their charge accumulating and amplifying or gating structures fabricated identically to those of the active light sensing pixels, but they are masked so that no light reaches them. Their output thus represents the background noise level, due, for example, to penetrating or non-visible radiation, heat, shot noise, and the like, and may thus be taken to represent the component of noise which appears in the output signal of each of the active sensing pixels.

A CCD timing module $24_j$ provides the clock signals for sending the sensor charge data to the initial preamplifier $24_i$, and also provides a dark pixel flag on line $24_l$ to a decision circuit $24_k$ during the time that the output from the dark pixels of sensor 20 appear in the data stream. Decision circuit $24_k$ receives the stream of 8-bit digital pixel values and holds the flagged dark pixel data, which it compares to a desired dark level. Decision module $24_k$ then sends an UP or DOWN signal to a voltage integrator $24_m$, the analog output of which provides the offset voltage to the preamplifier $24_i$. The voltage integrator stores a voltage value that can be adjusted up or down in small increments by the UP and DOWN signals. As the offset voltage causes the dark pixel value to reach the desired level, the voltage integrator will hold the offset voltage constant if no UP or DOWN signals are received from the decision module $24_k$. The dark current offset module 24a thus serves as a closed loop feedback from the noise component of the output pixel data stream of A/D converter 26, to the gain control 24, and it operates to zero out noise contribution prior to the high gain video signal amplification of gain control 24. This results in enhanced image quality over a much greater temperature range, and assures that the preamplifier threshold level remains effective despite drift or component aging. Notably, the decision module $24_k$ operates on the digitized amplified dark current pixel value, and thus provides a highly accurate correction for current operating conditions.

The circuit works on all frames, even during video capture. If the gain that is selected is changed, then the offset voltage required may change also. The circuit will react to this and correct the offset voltage over the next few frames.

As also shown in FIG. 1A, in addition to the amplified video signal with a gain level $L_1 \ldots$ or $L_n$ on line 26a, the A/D converter 26 also receives a fine control adjustment signal on line 26b from D/A converter 24n. This is an analog voltage converted from an 8-bit control word which sets the range of the A/D converter 26 used to digitize the amplified video. As the value of the 8 bit control word provided to D/A converter 24n is reduced, lowering the voltage on line 26b, the A/D converter uses a smaller range. Thus, smaller inputs on line 26b represent larger portions of the range, and the image values are larger. In this way, lowering the D/A voltage on line 26b increases the apparent gain.

In a prototype embodiment, the coarse gain ranges are related by a factor of three, with relative gains of 0.5, 1.5, 4.5 and 13.5, and the switching between gain levels is coordinated with corresponding changes in the control word on line 26a to avoid changes in magnitude. When switching from one gain $L_i$ to another $L_{i+1}$, a corresponding change by a factor of three in the D/A signal on line 26b will result in a nearly identical image. For example, a coarse gain of 1.5 and a fine gain of 85 (that is, 255/3) corresponds to a coarse gain of 4.5 and a fine gain of 255. Thus, changes in fine gain are coordinated with operation of the gain selector, to smooth transitions between the coarse gain levels $L_1, L_2 \ldots$ That is, as the module determines that light levels or operator commands will require a jump in gain level, the fine control word is decreased (if the gain is to go up) or increased (if down) so that when gain level is switched, the transition appears smooth.

As previously mentioned, the resolution is modified in the spatial dimension 92 of FIG. 5 by changing the camera density which selectively activates certain detector elements on the detector array 20. Thus by decreasing the camera density by a two or four-factor, the resulting spatial resolution will similarly decrease by one-half or one-fourth, respectively. As more detectors are deactivated by decreasing the camera density, the amount of detail recorded along the axis 92 of FIG. 5 decreases. This can be a desirable feature if high detail is not required for a particular scene since it significantly reduces the amount of information stored by the system 10.

More particularly, the camera density is adjustable in a programmable fashion by a user at the computer 16 of FIG. 1, which transmits a signal to the camera processor 22. The processor 22 thereafter selects only the appropriate data to send to the image timer 14, corresponding to the commanded camera density that activates the particular detector elements within the array 20.

With respect to displayed resolution, a user most readily adjusts the displayed image quality by zoom operations. Because each frame stored by the system contains a unique time reference, the process of zooming is easily attained by skipping or duplicating frames in the scene without compromising the critical time relationships within the scene. The mouse 45 of FIGS. 1 and 4 allows the user to point to particular objects on the scene and zoom either in or out by clicking the mouse, to thereby see more or less detail of the image, respectively. It is particularly useful when used in conjunction with the time-crop control discussed earlier whereby a user can zoom out and crop several sequences of "dead" time within a long race to shorten the stored file length. The zoom operation is available along both directions of the displayed scene; that is, a zoom within the spatial and time dimensions may be made either concurrently or independently. Multiple zooms are centered on the display according to the selected point of interest. However, the information available during zoom operations is constrained to the amount of information captured according to the frame rate and density settings of the digital camera; it does not generate new information. If the display resolution exceeds the available captured resolution, the displayed image can be smoothed by an appropriate interpolation scheme.

The amount of information captured by the system 10 is itself an important quantity. The LS-CCD detector element array 20 of FIG. 1 is preferably 1024 elements long, which is commercially available. Once the detector array is sampled and digitized, each detector element activated has 8-bits, or a "byte", of information associated with the particular frame. In this configuration, each frame has 1024 bytes of information at the highest camera density. In a preferred embodiment, a block of information contains 16k-bytes of memory, and therefore sixteen frames form a block of information if every detector on the LS-CCD array is activated.

However, if a user decreases the camera density by activating every other pixel along the array 20, the data amount within one frame is reduced by one-half, i.e., to 512-bytes and the number of frames within a block of information increases to 32. This is an important feature because most computers are limited by processing speed and memory. If a long event is permanently recorded, at some point the amount of memory is exceeded. A virtual memory subsystem, or hard-disc drive, as described below in a preferred embodiment of the invention greatly adds to the amount of memory available for the system. Nevertheless, by reducing the camera density and frame rate, as well as the judicious cropping and data compression such as described below, the amount of digital information representing each frame and the rate at which data is transferred between the camera and the image timer can be greatly reduced.

The data rate processed by the system 10 typically does not exceed 10 Mbits/s (e.g., corresponding to 1000 frames per second and 1024 active detector elements with 8-bits per element). Thus the system 10 is generally not subject to noise problems, time delays and processing constraints so that the distance between the camera 12 and timer 14 of FIGS. 1 and 4 can be at least one thousand feet in length.

Figure 6:
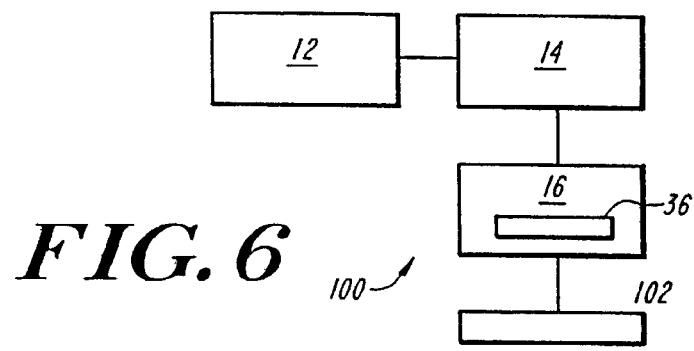
FIG. 6 illustrates a system constructed in accordance with the invention having a virtual memory subsystem.

Nevertheless, the amount of information stored and recorded can be large for a given event or series of events. At 10 Mbits/s, for example, every second of an event requires approximately one Mbyte of storage. In a preferred embodiment of the system 10, a virtual memory subsystem is included to accommodate the storage of data. FIG. 6 illustrates a system 100 constructed in accordance with the teachings herein which includes a virtual memory subsystem, or hard-disc drive 102.

The system 100 stores blocks of information into the virtual memory subsystem 102 when the blocks stored within the internal memory 36 for the main control computer 16 exceed a predetermined memory threshold. A user can select the threshold or rely on a default setting, e.g., 2-Mbytes of internal memory which can hold at least 125 blocks of information. Functionally, the main control computer accesses each block in internal memory by an associated software pointer which has a zero value when the block is transferred to the virtual memory subsystem.

Accordingly, the virtual memory subsystem can operate as an integral component of the system 100, and essentially transparent to a user. When a block of information is needed for processing by the main control computer 16, the block is transferred to internal memory 36 and an unneeded block transferred to the virtual memory subsystem 102. In this fashion, the system 100 can hold a scene of information which greatly exceeds the amount of RAM in the internal memory 36. In practical terms, the main internal memory 36 operates as a cache for the hard disc virtual memory 102.

The semantics for accessing frames from any associated storage memory is straightforward. Since a determinable number of frames comprise each of the blocks of information, the frame number divided by the number of frames per block gives the correct block address, and the remainder gives the correct frame address within the selected block. If cropping is involved, memory is simply re-ordered into new blocks of frames, with a corresponding reallocation of frame addresses.

Even with a very large memory capacity within the subsystem 102, it too can be exceeded when several motion events in a row are processed and stored, or long events are timed. The invention thus provides a compression system for reducing the amount of information needed in the blocks of information. The compression system is preferably available for use by a system constructed in accordance with the invention utilizing the virtual memory subsystem 102, which conveniently operates as a depository for the compressed data. The data compression can be automatic or selectively chosen by a user, for example after recording a particular motion event.

The compression system relies on the fact that each frame within the scene has the same background information within it. That is, if there is no motion activity within the FOV of the camera, each frame has practically the same information within it since the system constantly captures a single stationary line object; it is the motion of bodies crossing the FOV plane which generate a scene of interest. Thus, many frames stored for a given scene or motion event have redundant information.

More particularly, the camera 12 of FIG. 1 generates an 8-bit greyscale number, i.e., a number between a dynamic range having up to 256 shades of grey, for every active detector element in every frame. This corresponds to the amount of light energy within the image of the line object captured at that detector for a given frame. When a sequence of frames contains redundant information, the 8-bit numbers between successive frames are approximately equal.

In a preferred embodiment, the first step taken by the compression system is to convert every 8-bit number in a selected sequence of digital image frames into a 5-bit number in the range 0–31. Thus, an 8-bit number between the values 248–255 would be transformed to a 31 ;and a 8-bit number between 240–247 would be transformed to a 30; and so on. This compression process sacrifices the number of greyscales available within a picture (i.e. how "bright" a particular point on an object is represented by 32 numbers instead of 256 numbers) but saves a large amount of memory. It is worth noting that this is not a significant loss as some common VGA monitors have only 16 shades of grey available.

Figure 7:
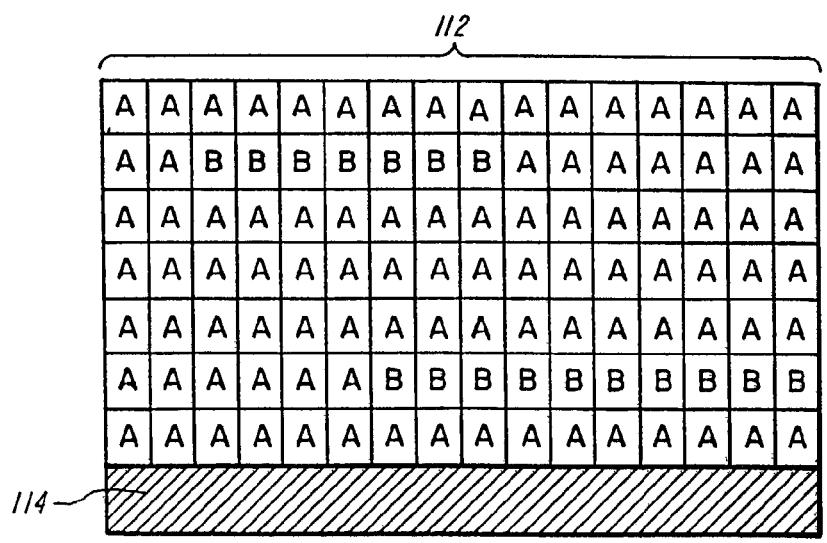
FIG. 7 shows a sequence of data corresponding to an illustrative first step in a compression of the sequence of digital image frames as provided by the invention.

FIG. 7 illustratively shows a sequence of frames 112 containing seven 5-bit numbers with a possible digital value of "A" or "B", and an associated time reference 114 in the last four bytes of the frame (in reality, there are 32 different values possible in this sequence, but "A" and "B" are used for ease of demonstration). Thus FIG. 7 illustrates a sequence of frames after the initial transformation by the compression system from 8-bit numbers to 5-bit numbers. In FIG. 7 (including FIGS. 7A and 7B), each square represents a byte. As you can see, the redundant 5-bit numbers are very apparent and unnecessarily waste memory space.

FIG. 7A shows the next step of the compression system where each row of 5-bit numbers is reformatted by accumulating numbers of equal value within a row and then representing these accumulations as a "count" and a "value". The count corresponds to the number of equivalent 5-bit numbers in a series, and the "value" corresponds to the actual 5-bit digital number. Thus, for example, the first row of sixteen 5-bit numbers "A" can be represented by a count "16" and a value "A". The second row has a count "2" having the value "A", followed by a count "7" having the value "B", and followed by a count "7" having a value of "A". This process continues until the information within every row of 5-bit numbers contains a progression of "counts" and "values", as FIG. 7A illustrates. It is worth noting that if the "count" is less than or equal to "7", it is representable by a 3-bit number (the number "8" is reserved for an indication that the count will be represented by a separate byte). Thus in the second row of FIG. 7A, each of the "counts" plus "values" can occupy the space of one 8-bit number. But if the count exceeds 7, the "count" and "value" numbers are each represented by a separate byte.

The last step of the compression system is shown in FIG. 7B. The significantly trimmed rows of FIG. 7A are appended to each other to form the final and compressed representation of the original sequence of digital image frames, which now occupies a significantly smaller amount of memory. The time reference information 114 is kept unchanged, however. Note that provided m is less than n in this compression scheme, the file cannot exceed its original memory size.

FIG. 8 illustrates a compression system 120 constructed in accordance with the invention. In particular, FIG. 8 shows three process actuators 121, 122, and 123 which perform the steps of the operations described in FIGS. 7, 7A, and 7B. A sequence of digital image frames enters the system 120 at a first data port 124. Process actuator 121 converts each n-bit number within the sequence as a representative m-bit number, to form, for example, an array such as shown in FIG. 7. Process actuator 122 reformats the array of rows of m-bit numbers into representative "counts" and "values" as for instance shown in FIG. 7A. Process actuator 123 again reformats the data to a sequential listing with the time reference information appended, such as shown in FIG. 7B. Data thus compressed exits the compression system from a second data port 126 for transmission to a storage memory, e.g., the virtual memory subsystem.

When a frame is required for processing by the main control computer, the compressed information is similarly uncompressed into a block of information before it is processed for display and manipulation by a user of the system. Upon uncompression, however, only 32 greyscale numbers are available, not the original 256.

As noted, there is a limit to the rate at which a computer, disk, or communication system can handle data. Typically, for example, the invention can generate visual scene information in excess of this data rate. This is particularly true if the scene information includes color information. Therefore, it may be necessary to compress scene information before it is stored by the computer, e.g., the main control computer 16 of FIG. 1.

Figure 8B:
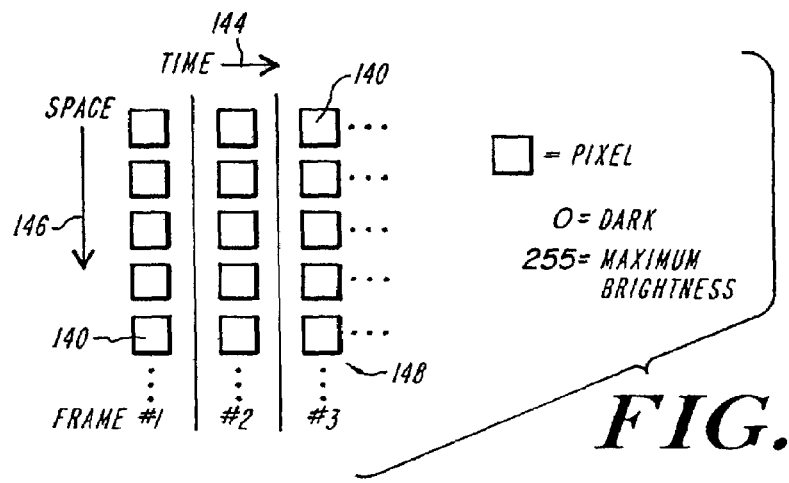
FIG. 8B shows representative data pixels generated in accord with the invention and within successive frames of a black and white camera.

Accordingly, the invention provides for another compression system 120a, FIG. 8A, which achieves high image quality over the variable data rates generated by the camera, e.g. the camera 12 of FIG. 1, as well as over the acceptable data rates handled by the computer. System 120a has three process actuators 121a, 122a, and 123a which perform the steps of the compression and quantizing operations described below with respect to FIGS. 8B–8G.

Figure 8C:
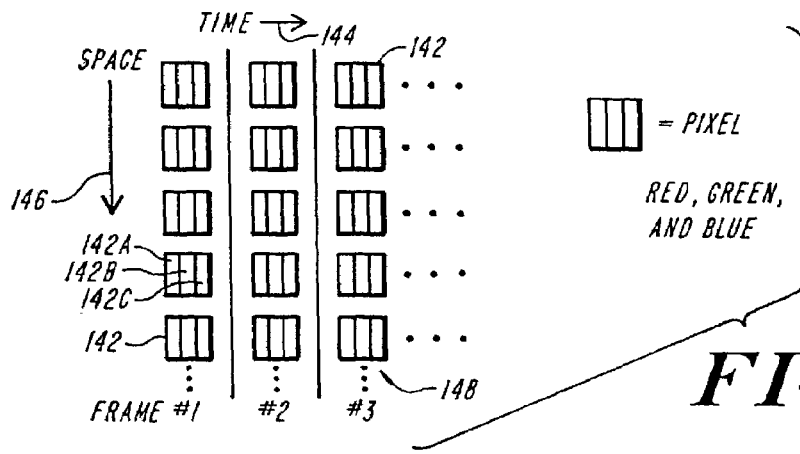
FIG. 8C shows representative data pixels generated in accord with the invention and within successive frames of a color camera.

FIG. 8B shows representative data pixels 140 from a black and white camera, where each illustrated pixel has an associated 8-bit numerical value, 0–255, representing the amount of light (light intensity) received by that pixel during acquisition of that picture. FIG. 8C, on the other hand, shows representative data pixels 142 from a color camera, wherein each pixel is represented by three numerical values 142a, 142b, and 142c, which are assigned, respectively, to red, green, and blue light intensities.

In either of FIGS. 8B and 8C, pixels are displaced horizontally along the time axis 144, and vertically along the spatial separation axis 146, such as described in connection with FIGS. 2 and 3. Each vertical array of data pixels is representative of the data acquired in one frame 148 of a scene.

Figure 8D:
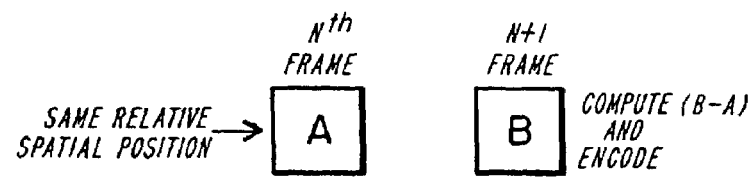
FIGS. 8D–8G show successive and illustrative compression operations in accord with further features of the invention.

To compress the information in either of FIGS. 8B or 8C, system 120a performs a series of compression steps on the data. First, actuator 121a of system 120a subtracts pixels in one frame from the data pixels generated at the same spatial location in the previous frame, such as shown in FIG. 8D. Accordingly, only those pixels whose values change will have non-zero values. This differencing operation of actuator 120a causes the relative distribution of pixel values to change: many more data pixels will be zero, or near zero, and those data pixels can be encoded in an efficient manner, such as described below.

Figure 8E:
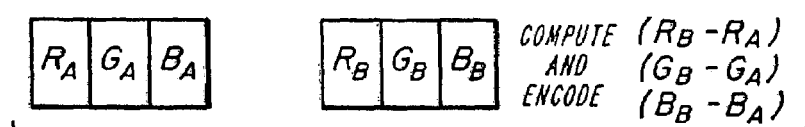

The compression operation illustrated in FIG. 8D can be performed similarly on color images by treating each color type as a single black and white image, such as shown FIG. 8E. In this compression, actuator 121a of system 120a subtracts the red values of each frame from the red value at the same spatial location within adjacent frames. Similarly, actuator 121a subtracts green values from the green values, and blue values from the blue values in adjacent frames. The encoded value of each resultant color pixel is then composed of three differences.

The above-described subtraction operations can be thought of as a "predictor" function, namely that the next pixel in time is predicted to be the same as the previous frame. Therefore, actuator 121a produces a "predictor" to reduce the amount of data required to represent the information. It is necessary to store, or transmit, more information only when the given prediction is incorrect, for example, only if at least one of the B-A pixel entries is non-zero.

Figure 8F:
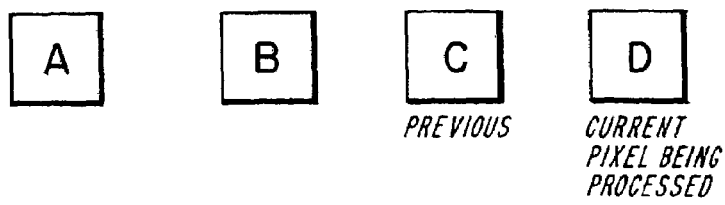

This differencing predictor may be enhanced further to better predict the pixel values in adjacent frames. For example, FIG. 8F illustrates a double differencing predictor technique in accord with the invention. Actuator 122a produces this predictor by computing a double difference whereby the difference of the preceding pixel pair is used to more accurately predict the current pixel.

More particularly, FIG. 8F shows four representative pixels A-D, which are sequential pixels in four adjacent frames. In this example, pixel D is the pixel being compressed by the actuator 122a. The predictor value of D, i.e., $D_{predictor}$, is calculated as follows:

$$D_{predictor} = C + (B - A)$$

This value is generated by the compressor at the camera, and by the decompressor when received from storage or along a communications line, from the already acquired values of A, B and C.

Thereafter, the predictor error is encoded by actuator 122a as:

$$E_{predictor} = D - D_{predictor}:$$

As with the simple differencing compression, it is only necessary to send this prediction error code if it is non-zero.

The double differencing predictor of FIG. 8F is easily extended to color images by treating each color portion of the pixel separately, similar to that described in FIGS. 8B and 8C. That is, actuator 122a performs three similar operations described above for each of the three color components of the pixel.

Figure 8G:
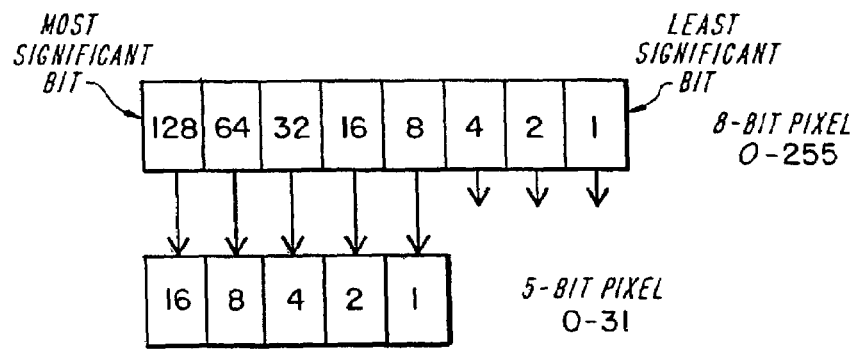

Actuator 123a of system 120a thereafter digitizes the image frames using an 8 bit conversion process to produce image pixel values in the range of 0 to 255. These pixel values are preferably quantized by actuator 123a by converting the 8-bit number to a number with fewer bits, e.g., 5-bits, before displaying the information to a viewer. One method for quantizing the data is to truncate the pixel value and ignore any lower order bits, such as illustrated in FIG. 8G.

Figure 8H:
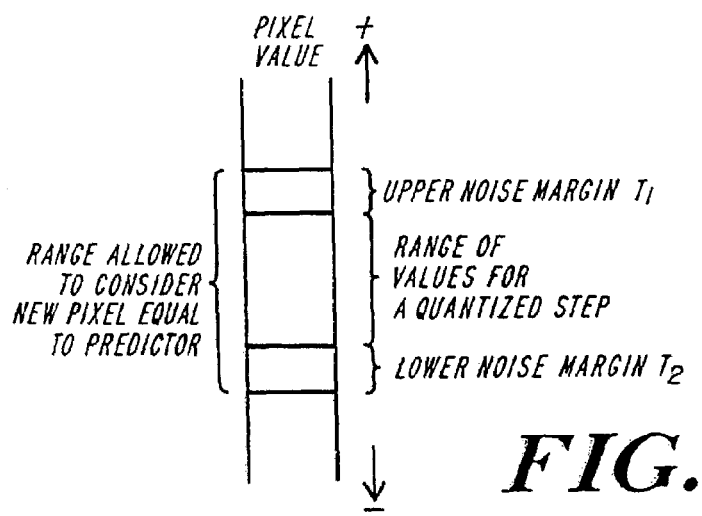
FIG. 8H illustrates an example of an enhanced quantizing process.

The invention also provides a more sophisticated quantizing process by detecting only those pixels values which differ from the predictor by an amount that is more than an amount T which represents a noise value and serves as the quantizing resolution step. Those pixels which oscillate across the quantizing step represent noise. Therefore, in accord with one embodiment of the invention, actuator 123a generates those pixels influenced by noise as identical 5-bit truncated values, i.e., as zero difference pixels. An example of this enhanced quantizing process is illustrated in FIG. 8H. Note that an upper quantizing step T1 and a different lower quantizing step T2 are shown, but a single step T may also be used.

Once the image data pixels are processed by the noise band quantizer and the predictor differencing processes above, the resulting set of pixels represent pixel differences. Since after applying the quantizer threshold T, a very large number of difference values will be zero, or nearly so, the data will be compressed from its original size. The differenced pixels may be further encoded, i.e., compressed, according to standard coding schemes, or according to the compression system such as described in connection with FIGS. 6 and 7.

In a color system, it is possible to encode the three color differences as a single symbol. Such an encoding may take advantage of correlated behaviour of the colors.

The compression system 120a of FIG. 8A may be augmented or supplemented with structure of the process actuators 121, 122, and 123 of FIG. 8, as appropriate, to perform additional or supplemental compression steps. Thus, as in compression system 120 of FIG. 8, a sequence of digital image frames entering the system 120a at a first data port 124a may be converted by process actuator 121a from n-bit numbers to m-bit numbers, to form, for example, an array such as shown in FIG. 7. Process actuator 122a thereafter reformats the array of rows of m-bit numbers into representative "counts" and "values" as for instance shown in FIG. 7A. Process actuator 123a again reformats the data to a sequential listing with the time reference information appended, such as shown in FIG. 7B. Data thus compressed exits the compression system from a second data port 126a for transmission to a storage memory, e.g., the virtual memory subsystem.

One important feature or advantage of the aforementioned compression system 120a is its real-time tunable compression capability. A single hard-wired compression circuit would force the system to pick a mid-point in image quality, thereby lowering the image quality even if the bandwidth were adequate for the image stream; or further limiting the speed even in cases where image quality is not a concern. Tunable compression, in accord with a preferred aspect of the invention, performs this trade-off in real-time and only as necessary.

This is accomplished as follows. A buffer is provided in the camera or in the compression module 120a for receiving the input line image data stream 124a, and a buffer monitor indicates how full the buffer is, e.g. ten percent, fifty percent, eighty percent. The type of compression implemented in module 120a is then selected based on the backlog of uncompressed image data in the buffer. At one extreme, there is no compression, or compression by a method such as first described above, which is lossless, or-very nearly so. At the other end is a compression method which allows a large "noise margin" in the quantizer, and reduces the bandwidth of the data stream enormously, at the expense of image quality. Since this noise margin can be set instantaneously in the compression module, the quality of the image can be adjusted such that it is maximized for a given data rate. For example, using the original wire interface of the prototype system which can move 500 KBytes per second, raw 16-bit-per-pixel image data would only go at a rate of 250 lines per second for a 1000-pixel line. In order to send lines faster than this, one must compress the image data in real time. How much compression to use depends on the line rate needed and the inherent "compressibility" of the data (a scene that is not changing often, for example, is much more compressible since the frame-to-frame differences are very small). The size of the buffer is selected so that the system can temporarily get "behind" in its compression of the data and only switch to a more drastic compression if the buffer continues to fall behind.

The system sets the tunable parameters based on the expected continuous data rate rather than overreacting to small spikes in the data rate caused by changes in the scene. One way of achieving this is for the system to implement a decision rule that it will use no compression until the data fills 10% of the buffer. At that point a small amount of compression is added. When the buffer reaches some critical state (say, 75% full) the system may resort to drastic measures, such as dropping every other frame or every other pixel.

When used as an event recording system, such as at the finish line of a race, the line scan camera system of the present invention may be operated to record and resolve motions one thousandth of a second apart. However, in such a setting, it is of the utmost importance not to lose whole sections of the image. The goal is to always completely utilize the 500 KB/s bandwidth of the wire while keeping the image as high a quality as possible. The 500 KB/s not only represents the bandwidth of a wire interface to the camera, but is very close to the best performance of modern disk drives. Thus, even in order to capture the image direct to disk, this data rate should be maintained. By locating the compression module 120a at or in the camera, none of the processing power of the system computer 16 is diverted to the compression process.

The foregoing "tunable" adaptive method of compression is highly effective for applicant's line images, and it is unlike compression used in many other video applications in that it sacrifices the quality of regions of the image for the quality of the edges. By contrast, most video or image compression algorithms (including Discrete Cosine Transform (DCT) or JPEG tend to smooth the edges in favor of the regions. In applicant's event camera application, it is the edges which typically determine which object is in front of which. Thus, the compression retains or enhances frame to frame edge discrimination at high data rates. Experience with a simple prototype implementation of this algorithm which has a theoretical upper limit of compression of five has established that in a well lit scene it is common to get real-time data compression ratios in the range of 3.5 to 4.5, with little noticeable effect on image quality.

In accordance with yet another aspect of a preferred embodiment of the present invention, a color line scan event camera as described above or, more preferably, an operator controlled computer 16 at a monitoring site, generates a small color palette to which it fits the color values of the pixels in its sequence of frames, so that each 15-bit RGB pixel value is represented by one of no more than 256 colors in the palette. In accordance with this aspect of the invention, rather than using a preset palette, or a two-pass procedure wherein all pixel data colors in every frame are reviewed and a palette is selected which most accurately represents the range of colors, the palette composition is adaptive, and its entries are selected as the frame data is being processed.

This aspect of the invention addresses the difficulties of color display in the uniquely time sensitive environment of the present invention. In general, compressed video data from the camera is stored, with time-marked information, so that it is accessible modulo an inherent latency time due-to the network communications, storage access, and generally also decompression processing. To make these delays sequential with a two-scan palettization process, or even to display retrieved and delayed excerpts with a small fixed palette. would be restrictive. In accordance with the present invention, video data, either directly from the camera or as it is retrieved from storage, is palettized for 256 color display by generating a color assignment table "on the fly". The palettization process introduces no observable delay, and each frame sequence begins with nearly perfect color fidelity. Later frames are then forced to fit the small color palette adaptively derived from the initial frames.

Figure 11:
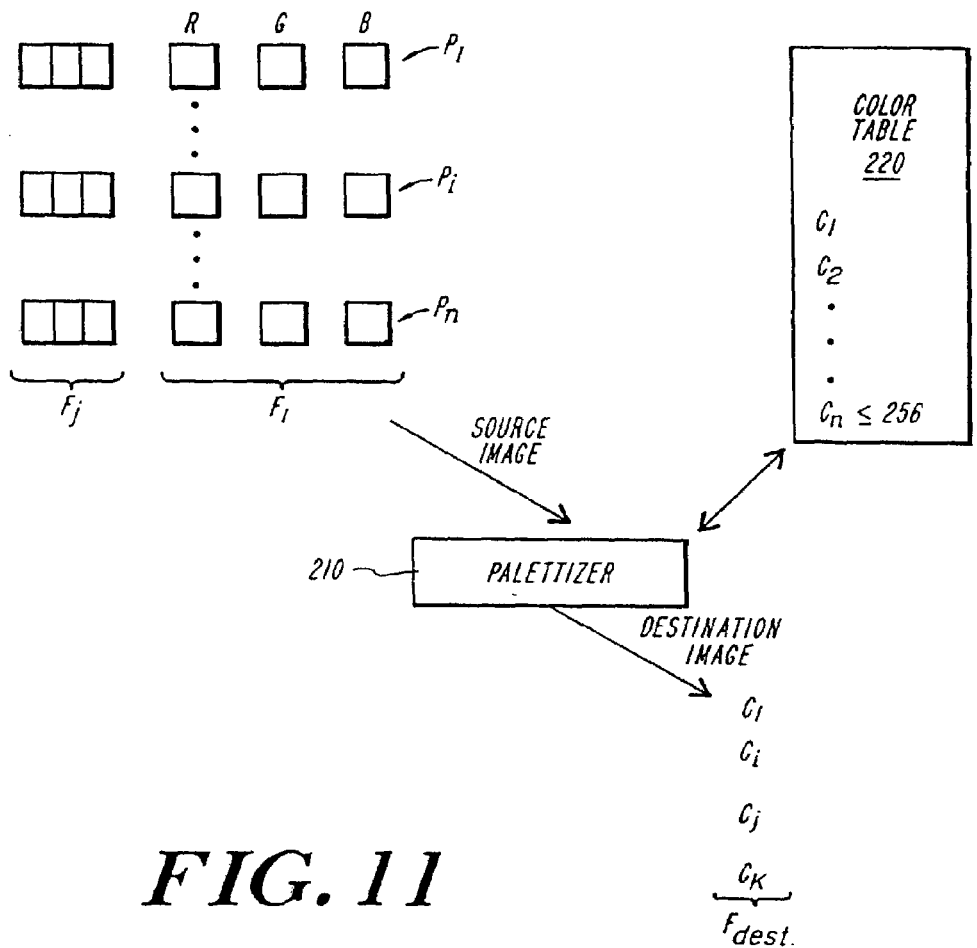
FIGS. 11 and 11A illustrate adaptive color palettization in a preferred embodiment of the system.

FIG. 11 illustrates this aspect of the invention. Each line or "frame" F1, . . . Fm generated by the color camera has n pixels specified by a five bit word for each of the red, green, and blue components, the 15 source bits making $2^{15}$=32K possible colors. This data can be directly used on a video display operating in the so-called "high color" mode of a video card capable of simultaneous display of 32K colors. However, to be useful for interactive examination of the image—e.g. for the operator to call up the image, inspect frames and time markings while viewing material on a display—it is generally preferable that the raw data be mapped to a destination image containing fewer bits per pixel. Many laptops and other PC's, for example, are operated in the 256 color mode.

It is desirable that the source image colors appear similar to the image formed with only the small palette of destination image colors. However the usual processes for such mapping involve either a time consuming run through the entire source image to identify the range of colors and pick a reduced set of representative colors that are sufficiently close, or involve mapping all colors to a predetermined, fixed palette. In the latter case, while the transformation to the color format of the destination image is quick, the colors may appear quite different from the actual view, leading to a misleading or unsettling appearance.

This problem is solved in accordance with a color palettization aspect of the present invention by a palettizer 210, which may for example be implemented in software in the terminal 16 (FIG. 1), that receives frames Fi of source image data and converts their RGB valued pixels Pi to pixel values $P'_i$ having a small set of color values Ci in a destination image frame $F'_i$. The values Ci are adaptively determined and built into a color table 220 as the conversion proceeds.

Figure 11A:
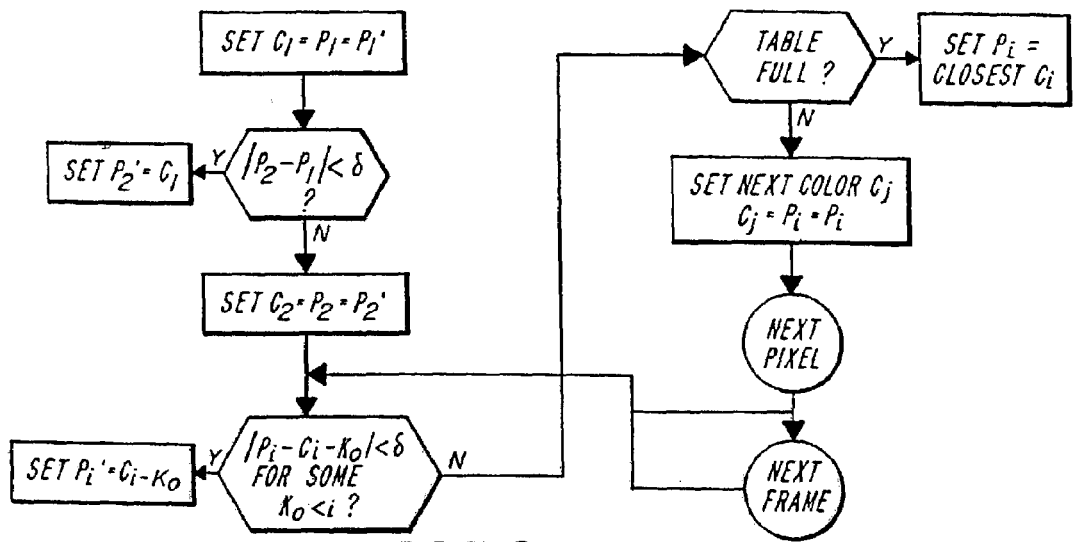

FIG. 11A illustrates this pixel color processing. The palettizer 210 is activated when an operator calls up a sequence of frames, typically specified by the timing markers which index all images. The color look up table 220 is initially empty. Palettizer 210 inspects the pixel values P1, P2 . . . Pn of the first frame F1, initially choosing the value of P1 as the first color C1 to add to the table 220 and assign to corresponding pixel $P'_i$ of the destination frame. Next a determination is made whether the value of the second pixel P2 of the frame is sufficiently close to C1 to represent it by the same color. Closeness may be defined, for example, by a distance function operating on the fifteen bit RGB coordinates, such as a sum of the differences in RGB values, or sum of squares of differences.

Other "distance" functions may be used which have been empirically found to reflect cognitive judgments of "closeness" in human color perception, to assure, for example, that a low intensity pure blue is never mapped to a low intensity red.

Continuing with the description of FIG. 11A, if P2 is close to P1, then the color value P'2 is also set to C1 . Otherwise, a new color C2 is entered in the table 220 and the value of P'2 in the destination image frame is set equal to C2. Thereafter, each pixel value Pi is inspected in order to determine if it is close to one of the already assigned colors $C_i-k_0$ for some value $k_0<i$, and, if so, Pi is mapped to the table color $C_i-k_0$. Otherwise, that is, if Pi is not close to any color, then provided the table 220 has not already been filled, the value of pixel Pi is used as the next color entry C in the table and is assigned to the pixel $P'_i$ in the destination frame. Otherwise, that is, if the table 220 is full but Pi is not close to (e.g., within δ of) any Ci, then a different mapping is employed. The pixel Pi is simply assigned that value Cj which is closer than the other colors of the table. At this stage in the processing, the palettizer operates on the pixels in sequence, and moves on to the next frame.

In this manner, a set of up to 256 colors are established for a color mapping palette, in which the palette initially matches the source colors very closely. After a number of frames have been processed and the table 220 is full, subsequently appearing colors will be "forced" into the existing palette and the image color will be less faithful. However, in the context of a fixed view line scanning camera, certain portions of the image, such as the track and landscape background of a race finish line, will remain unchanged throughout all frames, and will appear in accurate colors having been coded as initial entries in the adaptive color palette. Furthermore, when the color mapping is only used to call up and examine a few seconds' duration of line scan image data, the 256 colors will suffice to fully and accurately represent all frames.

The palettization steps, involving simple "closeness" measures on an incoming digital word pixel value against a small set of color value words from the table, is extremely fast, and palettization may proceed in real time as the frames are viewed.

Figure 9:
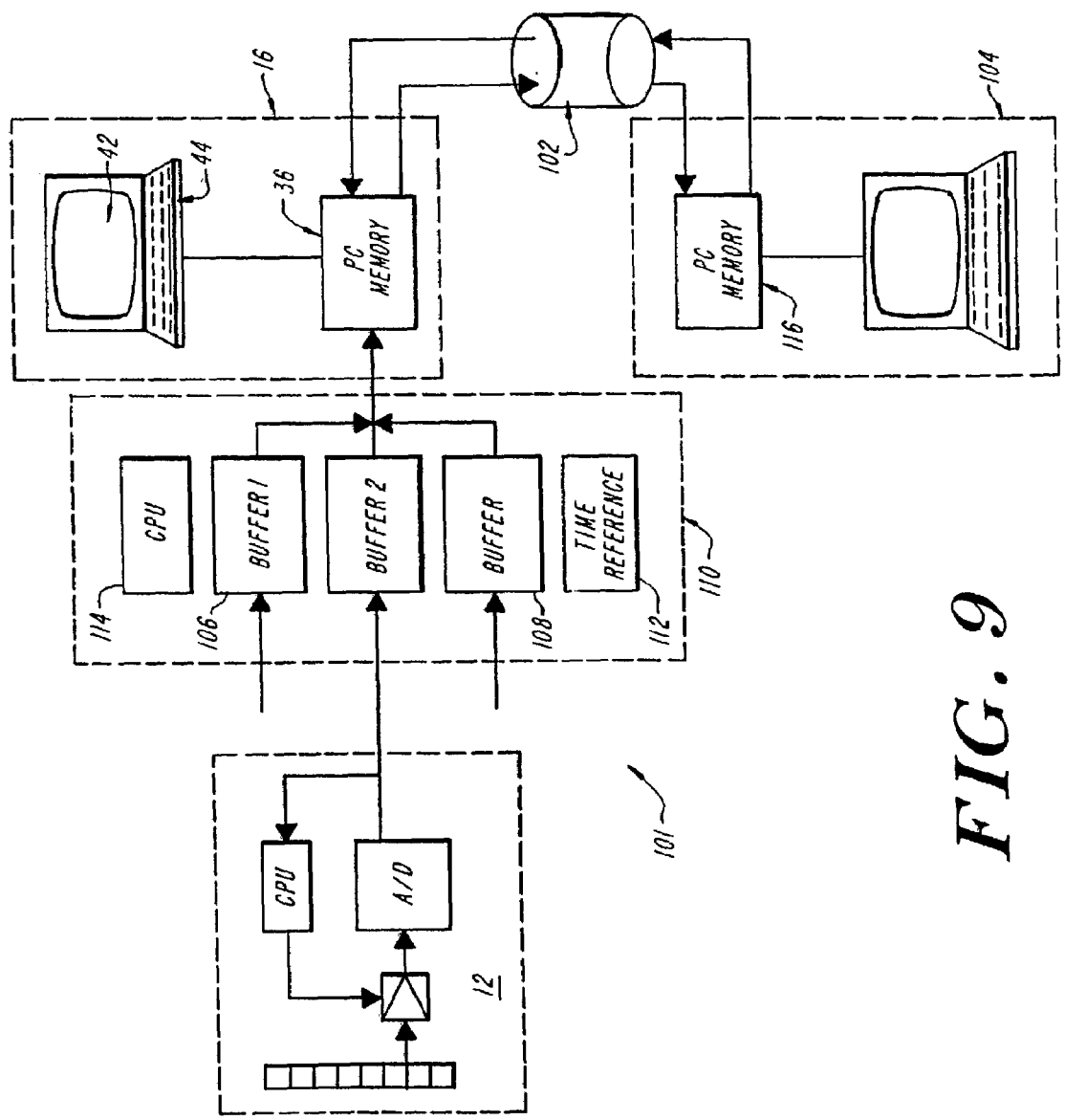
FIG. 9 illustrates a preferred embodiment of the invention utilizing a virtual memory subsystem, multiple cameras, and multiple buffers within an image timer.

With reference to FIG. 9, a system 101 constructed in accordance with the invention also shows an additional computer 104 and additional buffers 106 and 108 within the image timer 110. These additions are not at all required for the operation of the virtual memory subsystem 102, or any other component described above, but rather are useful in further features of the invention.

In particular, the computer 104 allows an additional user to access and analyze portions of previously recorded segments that are stored onto the hard-disc 102. Similar to the main computer 16 of FIG. 1, blocks of information are loaded into the internal memory 116 before processing and displaying the information. All of the features available at the main control computer 16 are also available at the additional computer 104, thereby providing a convenient forum for other management of the data processed during a sequence of motion events, e.g., races already recorded. Of course the main control computer 16 can also operate to review previously recorded segments of any prior motion event—and even during the activities of a current motion event—or operate in a real-time mode and display the current motion event as captured by the camera 12.

A plurality of computers, like the computer 104, are similarly attached to the virtual memory subsystem if other users wish to simultaneously access the data stored on the hard disc. A computer suitable for use within the system described includes common IBM personal computers or compatibles with an 8086 processor, a VGA video adapter, and 640K of RAM.

The buffers 106 and 108 within the image timer 110 of FIG. 9 illustrate another important feature of the invention, namely the addition of a plurality of digital cameras to the system 10 of FIG. 1. In some circumstances, it is desirable to view the motion of bodies crossing the plane in space from two or more vantage points. For example, in a race it is very possible in a close heat that one race participant blocks the view of a single camera with respect to another race participant. To correct this potential problem, one or more additional digital cameras, like the first one, can generate additional sequences of digital image frames of the line object of interest. Preferably, each additional camera views substantially the same plane in space, e.g., two cameras on either side of a race track exemplifies the use.

Since the buffers for every camera are within the image timer, a single clock 112 provides the time reference for all frames entering the timer. The timer processor 114 can thus mark each frame with a calibrated time reference thereby permitting each camera to operate asynchronously. That is, any of the plurality of cameras can have any selected frame rate or density, and the image timer continues to accurately mark each frame as it enters.

In a preferred system, rather than designing a multi-buffer timekeeping module for receiving and marking frames from a plurality of different cameras, the system employs cameras having tunable timers that are maintained accurate enough to mark each frame with an accurate time before sending it to storage or the central processor. The tunable timers are not themselves extremely accurate, and they may be implemented with simple oscillator circuits and dividers to form a local clock. However, each tunable camera periodically communicates with a precision timer and after initially establishing synchronous time, periodically re-tunes its clock rate to maintain synchronicity. Thus, in a system employing such cameras, each frame generated by a camera is marked with an "absolute" time marking.

Figure 9A:
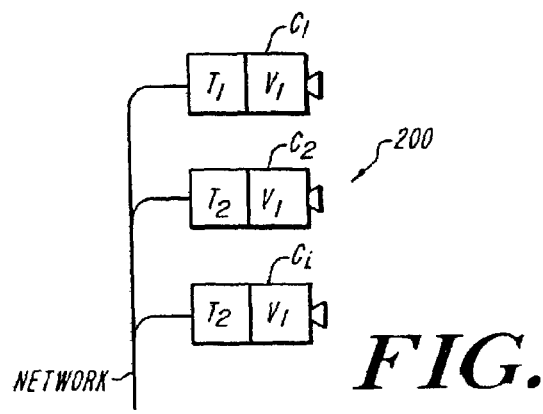
FIGS. 9A, 9B and 9C illustrate another multiple camera system with tunable timers in the cameras to mark frames.
Figure 9B:
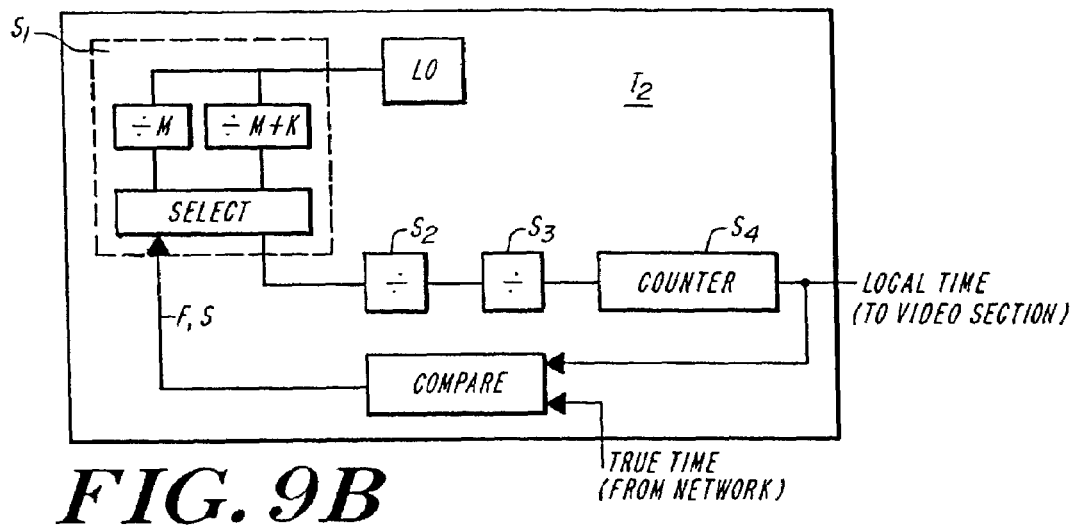

One embodiment of such a system 200 is illustrated in FIGS. 9A and 9B. The system includes a plurality of line scan cameras of which one is a primary camera $C_1$ and the rest are secondary or slave cameras $C_j$. The primary camera $C_1$ contains a precision time source T1, and an imaging portion $V_1$ consisting of a line scan sensor assembly and associated video components substantially as described above. Each slave camera $C_j$ contains a tunable time source T2 as described below, with an imaging portion $V_1$ identical to that of the first camera. All cameras connect over cabling, so that the secondary cameras may communicate, either directly or via a central control computer, with the precision time source of camera $C_1$. It will be understood in the discussion below that while $C_1$ has been indicated as containing a precision time source, to which each slave camera refers, the system may also consist entirely of slave cameras. In that event, camera $C_1$ is simply another slave camera, and a separate precision time source is provided, such as that of image timer 14 of FIG. 1, to which all the slave cameras periodically synchronize their clocks. The process of synchronizing includes specifying a time offset for each camera C, in a manner known in the art for dispersed ranging or time recording systems, to compensate for the delays in sending and receiving time check messages along the cabling referencing the source timer T1 (i.e. conduction delays, switching delays, and network message handling delays), and this initial offset correction will accordingly be assumed in the discussion that follows.

The local timer T2 of each slave camera is shown in FIG. 9B, and consists of a local oscillator L0 together with one or more intermediate frequency stages S1, S2, S3 and a clock synthesis or counter stage S4. The intermediate frequency stages typically are. formed by simple divide-by-n circuits— e.g. special logic arrays—while the clock synthesis stage comprises a circuit of one or more adders, counters and the like which constitute a timer using selected ones of the IF signals. The local oscillator LO may be any locally available frequency source, such as a 16 MHz clock of the camera's microprocessor controller, a separate timing chip or the like. Since the IF divider stages simply divide the local oscillator frequency, the resulting local timer is accurate to within a tolerance corresponding to that of the oscillator.

As shown in FIG. 9B, one of the intermediate frequency clock stages, illustratively SI, referred to herein as the "prescaler" stage, contains two divider circuits with closely related divisors m and m+k, where k is a small number such as 1 or 2, so that depending which divider is used, it puts out a clock pulse train of frequency f/m or f/(m+k), f being the local oscillator frequency. The divisors m and m+k are selected so that one frequency f/m results in a faster-than-actual time clock rate, while the other f/(m+k) results in a slower-than-actual clock operation.

For use in a line scan event timing camera, it is preferable that the timer resolve imaged events with a resolution of approximately one millisecond or better. One representative embodiment having such resolution is implemented using a 16 MHz local oscillator, a single frequency divider or prescaler stage S1, and a 32-bit counter. The prescaler for normal clock operation might divide the oscillator frequency by a number n to achieve an approximately accurate clock. In accordance with the present invention the numbers m and k referred to above are selected to be n−1 and 2, respectively, so that the prescaler contains a divide by (n−1) and a divide by (n+1) circuit. One of these (n−1) results in a fast IF clock "F", while the other (n+1) produces a slow IF clock "S". A selector operates at some rate controlled by the camera processing circuits, which exchange timing information with the precision time source and select one divisor or the other depending whether the clock time is presently early or late. The rate of these special cycles and the direction of timing error determines the apparent speed of the local oscillator at any instant in time, and once synchronicity is established, maintain the absolute timing error within preset limits.

For example, a 16 MHz oscillator would nominally be divided by 125 to form a 128 KHz clock value. If the prescaler uses a divide by 124 cycle every millisecond, then the nominal 128 KHz clock rate will increase to 128.0079125 KHz, a 61 parts per million increase. Likewise, if the prescaler uses a divide by 126 cycle every millisecond, the clock rate will decrease by 61 parts per million. Thus, by changing the amount of time during which N+1 or N−1 cycle prescaling is performed by the prescaler, the clock may be advanced or retarded by several milliseconds per minute, and by retuning at much shorter intervals, the clock time may be maintained with the necessary accuracy.

Figure 9C:
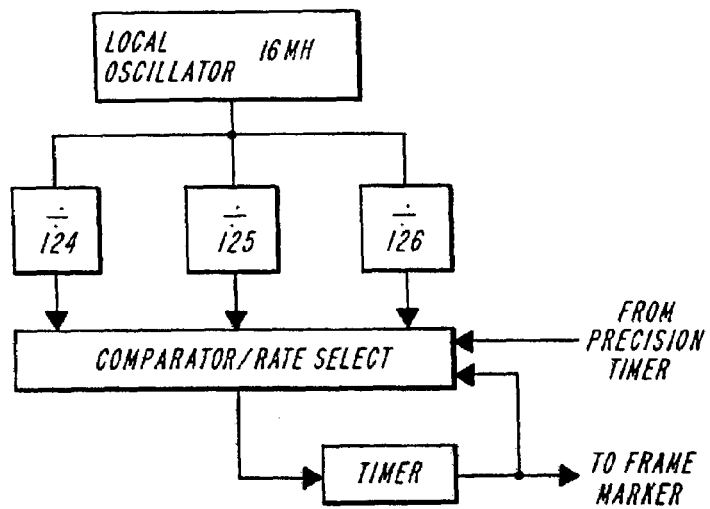

By using three divisors 124, 125 and 126, the clock may be run at a slow, normal or fast rate. In this case, the normal divisor 125 may be used by default, until the comparator determines it is necessary to accelerate or retard the clock. FIG. 9C shows such a local clock with three discrete timing rates for the phase-locked tracking of the precision source.

This capability allows the camera to adjust its clock until it matches the clock of the reference timer. Once the camera has adjusted its clock well enough, it can use its own local timer value to mark time on the image frames. Periodically, the camera checks actual time and sets the prescaler timing to advance or retard the local clock to keep in synchronicity.

In this manner, the non-precision local oscillator in each secondary camera provides a continuously tuned local clock that, although apparently speeding up or slowing down by as much as one tenth of one percent, changes its direction of error frequently and always tracks the precision timer within one, or even one-tenth of a, millisecond.

Figure 10:
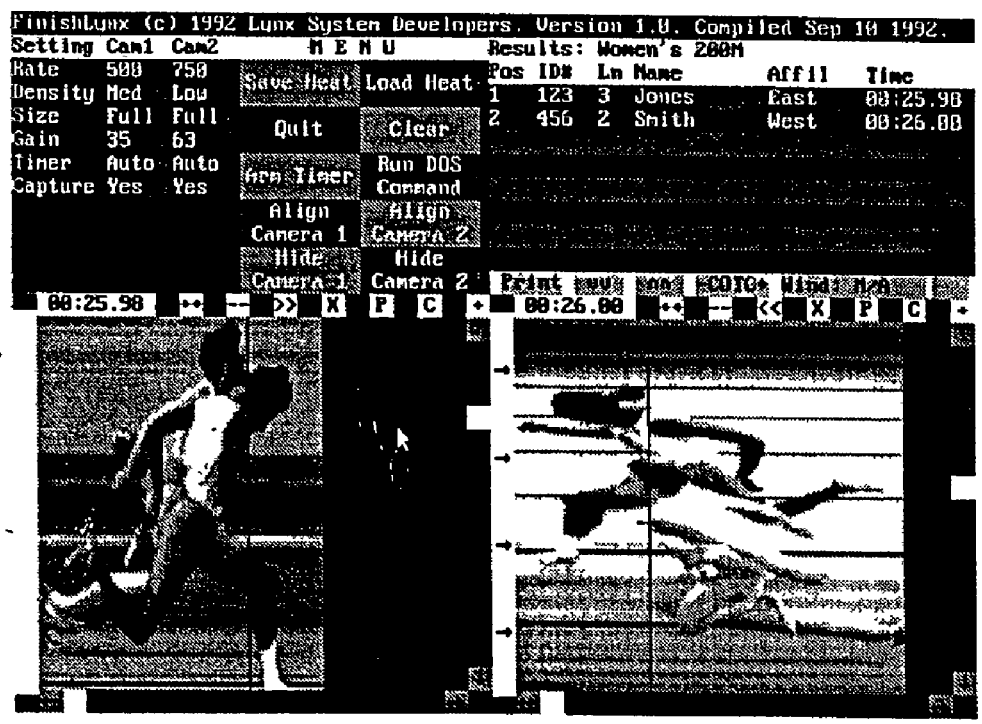
FIG. 10 illustrates a display scene showing two scene sequences generated by two separate cameras.

FIG. 10 illustrates a typical display of a race having two separate cameras on opposing sides of the track. This image is available to any of the computers discussed herein, including the additional computer 104, provided at least two cameras are integrated into a system constructed in accordance with the invention.

In a preferred embodiment, the direction of any displayed sequence of digital image frames forming a scene is reversible by re-ordering the sequence of frames. Thus for example, both of the scenes displayed within FIG. 10 can be reversed if selected in preference by a user of the computer. By operation of a mouse therefore, the separate views of the identical participants within the two scenes can appear to have a motion in the same direction.

The system described herein has other features available to users at any connected computer. Prior to recording an motion event, for example, a selectable part of the displayed scene can be uniquely associated with an object identifier. Thus along the spatial (vertical) domain of the screen, one or more lanes on a race course—and in particular the runner within—can be associated with a particular portion of the screen. A user can, for example, point to that portion and acquire the information relating to that lane, like the entrant's name. Furthermore, because every portion displayed on the screen has a unique time reference associated with it, a user can similarly access and display the time associated with a selected portion on the screen and display its results. In operation, for example, a user can select the lane of the winner in a race to see the person's name; and, more particularly, a user can select the first portion of the winner's body crossing the finish line to display the associated win time. In a preferred embodiment, both the object identifier and the time associated with any portion of the scene on display are automatically entered in a results table if selected by the user.

Any display, showing a scene, race results, or any other information selectable by the user can be printed at any time by an appropriate print command selected at that computer.

The term "greyscale" as used herein shall include not just classic greyscale values but also can include an equivalent color representation (e.g., either a single value or a series of values representing different colors).

Appendix I is an object code listing of a program for carrying out many of the functions described herein. This program is executable on any Intel X86 based personal computer system under MS-DOS.

It is accordingly intended that all matters contained in the above description or shown in the accompanying drawings be interpreted as illustrative rather than in a limiting way.

It is also understood that the following claims are intended to claim all of the specific and generic features of the invention as described herein, and all the statements of the scope of the invention.

What is claimed is:

1. A compression system for compressing a sequence of digital data frames, wherein each of said digital data frames forms a column of n-bit greyscale numbers representative of luminance values detected at pixels of a line sensor on which a fixed line portion of a scene is imaged in a video camera, and wherein said sequence forms an array of rows of n-bit numbers, such compression system comprising:

A. greyscale conversion means, for convening each of said digital data frames into a column of m-bit greyscale numbers, wherein the integer m is less than z thereby forming an array of rows of m-bit numbers;
   B. a counter means, which provides a count of the number of occurrences of equivalent m-bit greyscale numbers in adjacent frames in each row of said array of rows of m-bit numbers;
   C. a row reformatting means, for reformatting each row of said array of rows of m-bit numbers such that every row sequence of equivalent m-bit numbers is represented by one m-bit number value and the count thereof; and
   D. a memory reformatting means, for storing each reformatted row of said array of rows sequentially; whereby said compression system reduces the memory required to store said sequence of digital data frames representing the fixed line portion of the imaged visual field.

2. The compression system of claim 1, wherein said row reformatting means reformats each row of said ray of rows of m-bit numbers such that said one m-bit number and the count thereof are represented by one n-bit number.

3. The compression system of claim 1, wherein said row reformatting means reformats each row of said array of rows of m-bit numbers such that said count thereof is represented by one n-bit number.

4. The compression system of claim 1, further comprising compression accuracy control means, for selectively controlling the accuracy of the information stored by said compression system by selectively altering said integer m.

* * * * *